United States Patent
Uchida et al.

(10) Patent No.: US 7,198,952 B2
(45) Date of Patent: Apr. 3, 2007

(54) CATALYST DETERIORATION DETECTING APPARATUS AND METHOD

(75) Inventors: Takahiro Uchida, Susono (JP); Hiroshi Sawada, Gotenba (JP); Toshinari Nagai, Sunto-gun (JP); Akihiro Katayama, Toyota (JP); Yasuhiro Kuze, Susono (JP); Naoto Kato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 512 days.

(21) Appl. No.: 10/193,900

(22) Filed: Jul. 15, 2002

(65) Prior Publication Data

US 2003/0017603 A1    Jan. 23, 2003

(30) Foreign Application Priority Data

Jul. 18, 2001 (JP) ............................. 2001-218661
Sep. 19, 2001 (JP) ............................. 2001-285885

(51) Int. Cl.
| | |
|---|---|
| G01N 31/10 | (2006.01) |
| G01N 33/22 | (2006.01) |
| F01N 3/18 | (2006.01) |
| F01N 3/20 | (2006.01) |
| F01N 3/22 | (2006.01) |

(52) U.S. Cl. ............................. 436/37; 60/276; 60/277; 422/98; 422/108; 436/137; 436/155; 436/159; 436/181

(58) Field of Classification Search .................. 436/37, 436/137, 149, 155, 159, 181; 60/276–277; 422/98, 108

See application file for complete search history.

(56) References Cited

U.S. PATENT DOCUMENTS

| 5,077,970 | A | * | 1/1992 | Hamburg ....................... 60/274 |
|---|---|---|---|---|
| 5,282,383 | A | * | 2/1994 | Kayanuma ................... 73/118.1 |
| 5,335,538 | A | | 8/1994 | Blischke et al. |
| 5,414,996 | A | * | 5/1995 | Sawada et al. ............... 60/277 |
| 5,509,267 | A | * | 4/1996 | Theis ........................... 60/274 |
| 5,531,069 | A | * | 7/1996 | Katsuhiko .................... 60/276 |
| 5,533,332 | A | * | 7/1996 | Uchikawa ..................... 60/274 |
| 5,545,377 | A | * | 8/1996 | Fukaya et al. ............... 422/108 |
| 5,606,855 | A | * | 3/1997 | Tomisawa ..................... 60/274 |
| 5,609,023 | A | * | 3/1997 | Katoh et al. .................. 60/276 |
| 5,678,402 | A | * | 10/1997 | Kitagawa et al. ............. 60/276 |
| 5,842,339 | A | * | 12/1998 | Bush et al. ................... 60/274 |
| 5,842,340 | A | * | 12/1998 | Bush et al. ................... 60/276 |
| 5,848,527 | A | * | 12/1998 | Mitsutani ..................... 60/274 |
| 5,896,743 | A | * | 4/1999 | Griffin ......................... 60/274 |

(Continued)

FOREIGN PATENT DOCUMENTS

DE    198 01 625 A1    7/1999

(Continued)

Primary Examiner—Arlen Soderquist
(74) Attorney, Agent, or Firm—Oliff & Berridge, PLC

(57) ABSTRACT

An upstream side catalyst and a downstream side catalyst are disposed in an exhaust passage. A first oxygen sensor is disposed between these two catalysts and a second oxygen sensor is disposed downstream of the downstream side catalyst. The air-fuel ratio is forcibly oscillated and the oxygen storage capacity of the upstream side catalyst is detected. Deterioration of the upstream side catalyst is then detected based on whether this oxygen storage capacity is larger than a predetermined value. The forced oscillation of the air-fuel ratio is performed only when the oxygen storage state of the downstream side catalyst is appropriate.

17 Claims, 18 Drawing Sheets

U.S. PATENT DOCUMENTS

| | | | |
|---|---|---|---|
| 5,901,552 A | 5/1999 | Schnaibel et al. | |
| 5,966,930 A * | 10/1999 | Hatano et al. | 60/276 |
| 6,085,518 A * | 7/2000 | Yamashita et al. | 60/276 |
| 6,116,021 A * | 9/2000 | Schumacher et al. | 60/274 |
| 6,145,304 A * | 11/2000 | Takahashi et al. | 60/277 |
| 6,161,428 A * | 12/2000 | Esteghlal et al. | 73/118.1 |
| 6,173,569 B1 | 1/2001 | Kusada et al. | |
| 6,199,373 B1 * | 3/2001 | Hepburn et al. | 60/274 |
| 6,253,541 B1 | 7/2001 | Sullivan et al. | |
| 6,289,673 B1 * | 9/2001 | Tayama et al. | 60/285 |
| 6,338,243 B1 * | 1/2002 | Takaoka et al. | 60/277 |
| 6,453,661 B1 * | 9/2002 | Lewis et al. | 60/277 |
| 6,481,201 B2 * | 11/2002 | Kako et al. | 60/285 |
| 6,600,998 B1 | 7/2003 | Majima et al. | |
| 6,622,478 B2 * | 9/2003 | Nakamura | 60/285 |
| 6,673,619 B2 * | 1/2004 | Sawada | 436/37 |
| 6,679,050 B1 * | 1/2004 | Takahashi et al. | 60/285 |
| 6,755,013 B2 * | 6/2004 | Uchida | 60/277 |

FOREIGN PATENT DOCUMENTS

| | | |
|---|---|---|
| DE | 41 28 823 C2 | 6/2000 |
| EP | 0 915 244 A2 | 5/1999 |
| JP | A 5-133264 | 5/1993 |
| JP | A 5-209510 | 8/1993 |
| JP | A 8-254147 | 10/1996 |
| JP | A-2001-115879 | 4/2001 |

\* cited by examiner

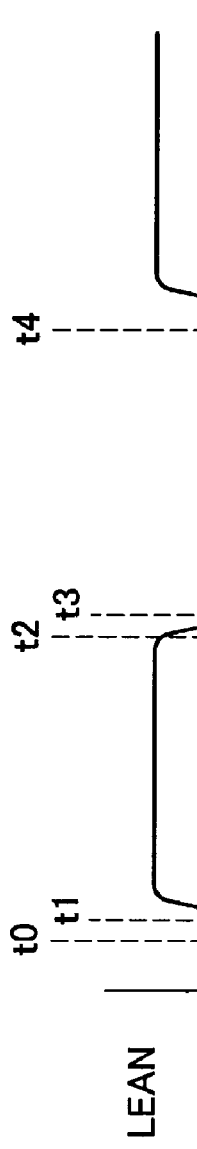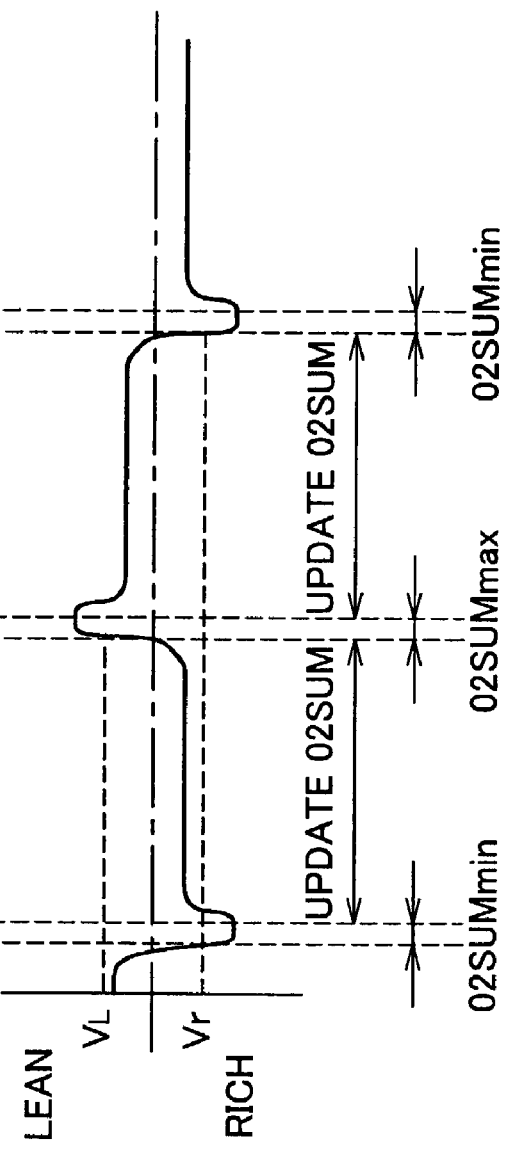
FIG. 3A
FIG. 3B

CATALYST DETERIORATION DETECTING APPARATUS AND METHOD

INCORPORATION BY REFERENCE

The disclosure of Japanese Patent Application No. 2001-218661 filed on Jul. 18, 2001 and No. 2001-285885 filed on Sep. 19, 2001 including the specification, drawings and abstract are incorporated herein by reference in their entireties.

BACKGROUND OF THE INVENTION

1. Field of the Invention

The invention relates generally to a catalyst deterioration detecting apparatus that uses a catalyst having an oxygen storage capability. More specifically, the invention relates to a catalyst deterioration detecting apparatus that detects deterioration of a catalyst that purifies exhaust gas of an internal combustion engine.

2. Description of Related Art

A catalyst used to purify exhaust gas is disposed in an exhaust passage of an internal combustion engine for a vehicle. This catalyst is capable of storing an appropriate amount of oxygen. When the exhaust gas that flows into this catalyst contains unburned components such as hydrocarbons HC and carbon monoxide CO and the like, the catalyst uses this stored oxygen to oxidize them. Also, when the exhaust gas contains oxides such as nitrogen oxide NOx and the like, the catalyst reduces them and stores the resultant oxygen.

The catalyst disposed in the exhaust passage of an internal combustion engine for a vehicle aims to purify the exhaust gas as described above. Therefore, the purification capability of the catalyst is largely affected by its oxygen storage capability. Accordingly, the deterioration state of the purification capability of the catalyst is determined by the maximum amount of oxygen able to be stored by the catalyst, i.e., by the oxygen storage capacity. As a result, in order to determine the deterioration state of the catalyst, it is necessary to accurately detect the oxygen storage capability of the catalyst.

As related art, an apparatus has been known that accurately detects the oxygen storage capability of the catalyst by oscillating the air-fuel ratio of the exhaust gas flowing into the catalyst (hereinafter referred to as the "exhaust air-fuel ratio") back and forth between rich and lean so as to increase and decrease the amount of oxygen stored in the catalyst and detecting the exhaust air-fuel ratio of the exhaust gas flowing out on the downstream side of the catalyst with an air-fuel ratio sensor. The deterioration of the catalyst from the detected oxygen storage capability is then determined (Japanese Patent Application Laid-Open Publication Nos. 5-133264 and 5-209510 and the like). Japanese Patent Application Laid-Open Publication No. 5-133264, for example, discloses an apparatus that detects the oxygen storage capacity of a catalyst disposed in an exhaust passage by forcing exhaust gas, with the rich or lean air-fuel reaction, to the internal combustion engine. Exhaust gas having a shortage of oxygen that contains unburned components, such as HC and CO, is supplied to the catalyst while the air-fuel ratio is rich. When this kind of exhaust gas having a shortage of oxygen flows into the catalyst, the catalyst discharges oxygen stored therein in an attempt to purify the exhaust gas. Accordingly, when exhaust gas having a shortage of oxygen flows into the catalyst and oxygen continues to be discharged from the catalyst over an extended period of time, the catalyst eventually discharges all of its oxygen such that it is no longer able to oxidize the HC and CO. This state of the catalyst will hereinafter be referred to as "minimum stored oxygen state".

Conversely, exhaust gas having an excess of oxygen that contains NOx flows into the catalyst while the air-fuel ratio is lean. When this kind of exhaust gas having an excess amount of oxygen flows into the catalyst, the catalyst stores the excess oxygen in the exhaust gas in an attempt to purify the exhaust gas. Accordingly, when exhaust gas having an excess amount of oxygen flows into the catalyst and oxygen continues to be stored in the catalyst over an extended period of time, the catalyst eventually becomes full of oxygen such that it can no longer reduces the incoming NOx and therefore can no longer purify the exhaust gas. This state of the catalyst will hereinafter be referred to as "maximum stored oxygen state".

The apparatus according to the foregoing related art controls the air-fuel ratio of the mixture supplied to the internal combustion engine so as to repeatedly put the catalyst in the minimum stored oxygen state and the maximum stored oxygen state, alternating between the two states. The oxygen storage capacity of the catalyst is then obtained by integrating the amount of oxygen stored in the catalyst during the process in which the catalyst shifts from the minimum stored oxygen state to the maximum stored oxygen state, or by integrating the amount of oxygen discharged from the catalyst during the process in which the catalyst shifts from the maximum stored oxygen state to the minimum stored oxygen state. The foregoing apparatus determines whether the catalyst is normal or is deteriorating based on whether the oxygen storage capacity obtained in the foregoing manner is larger than a predetermined determination value.

In this apparatus, the air-fuel ratio of the mixture is switched from lean to rich after the catalyst reaches the maximum stored oxygen state and from rich to lean after the catalyst reaches the minimum stored oxygen state. For a certain period of time after the catalyst has switched from lean to rich, exhaust gas having an excess amount of oxygen continues to flow into the catalyst, which is in the maximum stored oxygen state. As a result, unpurified exhaust gas having an excess amount of oxygen flows out downstream of the catalyst during this period. Similarly, for a certain period of time after the catalyst has switched from rich to lean, exhaust gas having a shortage of oxygen flows out downstream of the catalyst, which is in the minimum stored oxygen state.

One conceivable method to prevent unpurified exhaust gas from being discharged into the atmosphere (i.e., making emissions worse) is, for example, to dispose a downstream side catalyst downstream of that catalyst. This configuration effectively prevents exhaust emissions from becoming worse by treating the unpurified exhaust gas that flows out from the catalyst on the upstream side with the downstream side catalyst.

Even when the downstream side catalyst is provided, however, if exhaust gas having an excess amount of oxygen flows out from the catalyst on the upstream side when the downstream side catalyst has stored substantially all of the oxygen it can store, that exhaust gas would pass straight through the downstream side catalyst and be discharged into the atmosphere as it is. Similarly, when the downstream side catalyst has discharged substantially all of its oxygen, if exhaust gas having a shortage of oxygen flows out from the catalyst on the upstream side, that exhaust gas would be discharged as it is into the atmosphere without being purified even by the downstream side catalyst.

In this way, when attempting to determine the deterioration of a catalyst by forcefully oscillating the air-fuel ratio back and forth between rich and lean, there is still a possibility of the air-fuel ratio being disturbed in the deterioration determination process, thereby temporarily worsening the exhaust emissions, when only providing a downstream side catalyst further downstream of the catalyst of which determination is being performed.

SUMMARY OF THE INVENTION

The invention thus provide a catalyst deterioration detecting apparatus for an internal combustion engine, which is able to complete a determination of catalyst deterioration without making the exhaust emissions worse. In order to achieve the foregoing, a catalyst deterioration detecting apparatus for an internal combustion engine according to a first aspect of the invention is provided with an upstream side catalyst disposed in an exhaust passage of the internal combustion engine, a downstream side catalyst disposed downstream of the upstream side catalyst, a first oxygen sensor that detects an oxygen concentration of exhaust gas that flows out from the upstream side catalyst and a controller that detects a maximum stored oxygen state of the upstream side catalyst from which exhaust gas having an excess amount of oxygen flows out downstream, based on a detection value of the first oxygen sensor, detects a minimum stored oxygen state of the upstream side catalyst from which exhaust gas having a shortage of oxygen flows out downstream, based on a detection value of the first oxygen sensor, forces an air-fuel ratio of a mixture supplied to the internal combustion engine to be rich after the upstream side catalyst becomes in the maximum stored oxygen state until the upstream side catalyst becomes in the minimum stored oxygen state, forces the air-fuel ratio of the mixture supplied to the internal combustion engine to be lean after the upstream side catalyst becomes in the minimum stored oxygen state until the upstream side catalyst becomes in the maximum stored oxygen state, selectively detects as the oxygen storage capacity of the upstream side catalyst an amount of oxygen discharged by the upstream side catalyst during a process in which the upstream side catalyst shifts from being in the maximum stored oxygen state to being in the minimum stored oxygen state and an amount of oxygen stored in the upstream side catalyst during a process in which the upstream side catalyst shifts from being in the minimum stored oxygen state to being in the maximum stored oxygen state, determines a state of deterioration of the upstream side catalyst based on the oxygen storage capacity, determines whether the downstream side catalyst is in an appropriate state to store both oxygen equal to, or greater than, a predetermined amount and discharge oxygen equal to, or greater than, a predetermined amount, and allows a series of processes to determine the deterioration state of the upstream side catalyst to start only when the downstream side catalyst is in the appropriate state.

Alternatively, the above catalyst deterioration detecting apparatus can be provided with a controller that alternatively correct at least one of a control parameter of the force-rich portion and a control parameter of the force-lean portion such that the downstream catalyst becomes in the appropriate state when the downstream side catalyst is not in the appropriate state.

Alternatively, a catalyst deterioration detecting apparatus according to another aspect of the invention is provided with a controller that detects an amount of oxygen stored in a catalyst, controls the amount of oxygen stored in the catalyst by controlling an exhaust air-fuel ratio of the exhaust gas flowing into the catalyst, detects the oxygen storage capability of the catalyst based on a history of the amount of stored oxygen detected by the stored oxygen amount detecting portion, while increasing and decreasing the amount of stored oxygen with the stored oxygen amount controlling portion, and allows detection by the oxygen storage capability detecting portion to start, wherein the controller allows detection of the oxygen storage capability to start only when the amount of stored oxygen that is detected is within a predetermined range.

Alternatively, in the above catalyst deterioration detecting apparatus, the controller can allow detection of the oxygen storage capability to start only when a variation in the amount of stored oxygen that is detected by the stored oxygen amount detecting portion is equal to, or less than, a predetermined value.

Catalyst deterioration detecting apparatuses having these configurations are able to detect catalyst deterioration without making exhaust emissions worse.

BRIEF DESCRIPTION OF THE DRAWINGS

The foregoing and further objects, features and advantages of the invention will become apparent from the following description of preferred exemplary embodiments with reference to the accompanying drawings, wherein like numerals are used to represent like elements and wherein:

FIG. 3 is a timing chart to explain a method of calculating the oxygen storage capacity of the catalyst according to the first exemplary embodiment of the invention;

DETAILED DESCRIPTION OF THE PREFERRED EXEMPLARY EMBODIMENTS

Hereinafter, exemplary embodiments of the invention will be described with reference to the accompanying drawings.

Exemplary Embodiment 1

Figure 1:
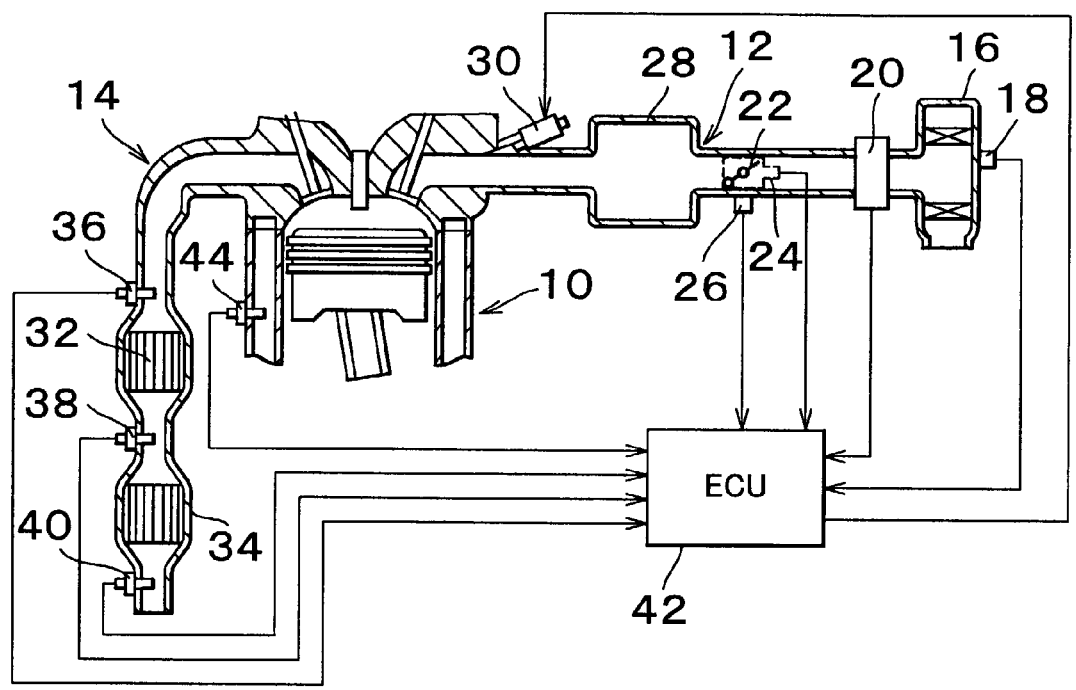
FIG. 1 is a diagram for explaining the configuration of a catalyst deterioration detecting apparatus according to a first exemplary embodiment of the invention.

FIG. 1 is a drawing to explain an internal combustion engine 10 in which is mounted a catalyst deterioration detecting apparatus, as well as the surrounding structure thereof, according to a first exemplary embodiment of the invention. An intake passage 12 and an exhaust passage 14 are communicated with the internal combustion engine 10. The intake passage 12 is provided with an air filter 16 on the upstream side end portion. An intake air temperature sensor 18 that detects an intake air temperature THA (i.e., outside air temperature) is mounted in the air filter 16.

An airflow meter 20 is disposed downstream of the air filter 16. The airflow meter 20 is a sensor that detects an intake air amount Ga which flows through the intake passage 12. A throttle valve 22 is provided downstream of the airflow meter 20. Near the throttle valve 22 are disposed a throttle sensor 24 that detects a throttle opening TA and an idle switch 26 which turns on when the throttle valve 22 is fully closed.

A surge tank 28 is provided downstream of the throttle valve 22. Also, a fuel injection valve 30 for injecting fuel into an injection port of the internal combustion engine 10 is disposed further downstream of the surge tank 28.

An upstream side catalyst 32 and a downstream side catalyst 34 are disposed in serial in the exhaust passage 14. These upstream side catalyst 32 and downstream side catalyst 34 are able to store a certain degree of oxygen and when the exhaust gas contains unburned components of HC and CO and the like, the upstream side catalyst 32 and downstream side catalyst 34 oxidize them with the stored oxygen. Further, when there are oxidizing components such as NOx and the like in the exhaust gas, the upstream side catalyst 32 and downstream side catalyst 34 reduce them and store the discharged oxygen. In this way, the exhaust gas discharged from the internal combustion engine 10 is purified inside the upstream side catalyst 32 and downstream side catalyst 34 by the process described above.

In the exhaust passage 14, an air-fuel ratio sensor 36 is disposed upstream of the upstream side catalyst 32 and a first oxygen sensor 38 is disposed between the upstream side catalyst 32 and the downstream side catalyst 34. Also, a second oxygen sensor 40 is disposed downstream of the downstream side catalyst 34. The air-fuel ratio sensor 36 is a sensor that detects the oxygen concentration within the exhaust gas. Meanwhile, the first oxygen sensor 38 and the second oxygen sensor 40 are sensors in which the outputs thereof greatly change when the oxygen concentration in the exhaust gas exceeds a predetermined value. The air-fuel ratio sensor 36 detects the air-fuel ratio of the mixture combusted by the internal combustion engine 10. Also, the first oxygen sensor 38 determines whether the exhaust gas after treatment by the upstream side catalyst 32 is fuel rich (i.e., whether it contains HC and CO) or fuel lean (whether it contains NOx). Moreover, the second oxygen sensor 40 determines whether the exhaust gas that passed through the downstream side catalyst 34 is fuel rich (i.e., whether it contains HC and CO) or fuel lean (whether it contains NOx).

As shown in FIG. 1, the catalyst deterioration detecting apparatus according to this exemplary embodiment is provided with an ECU (Electronic Control Unit) 42. Connected to this ECU 42 are the various sensors described above, a fuel injection valve 30, a water temperature sensor 44 that detects a cooling water temperature THW of the internal combustion engine 10, and the like.

According to the system shown in FIG. 1, the exhaust gas discharged from the internal combustion engine 10 is first purified with the upstream side catalyst 32. Then, any exhaust gas that was not completely purified with the upstream side catalyst 32 is purified with the downstream side catalyst 34. Because the upstream side catalyst 32 is positioned near the internal combustion engine 10, the temperature of the upstream side catalyst 32 rises and reaches the active temperature quickly after starting of the internal combustion engine 10. Therefore, the upstream side catalyst 32 exhibits excellent exhaust gas purification performance immediately after the internal combustion engine 10 has been started. In order for the system to constantly exhibit appropriate exhaust gas purification performance, it is necessary to quickly detect deterioration of the upstream side catalyst 32.

As described above, the upstream side catalyst 32 purifies the exhaust gas by discharging oxygen into fuel rich exhaust gas. The upstream side catalyst 32 also purifies the exhaust gas by storing the excess oxygen that is in the fuel lean exhaust gas. Therefore, purification performance of the upstream side catalyst 32 decreases as the maximum amount of oxygen that the upstream side catalyst 32 is able to store, i.e., the oxygen storage capacity OSC of the upstream side catalyst 32, decreases. Therefore, the catalyst deterioration detecting apparatus according to this exemplary embodiment detects the oxygen storage capacity OSC of the upstream side catalyst 32 and determines the degree of deterioration of the upstream side catalyst 32 based on the detected value.

Figure 2:
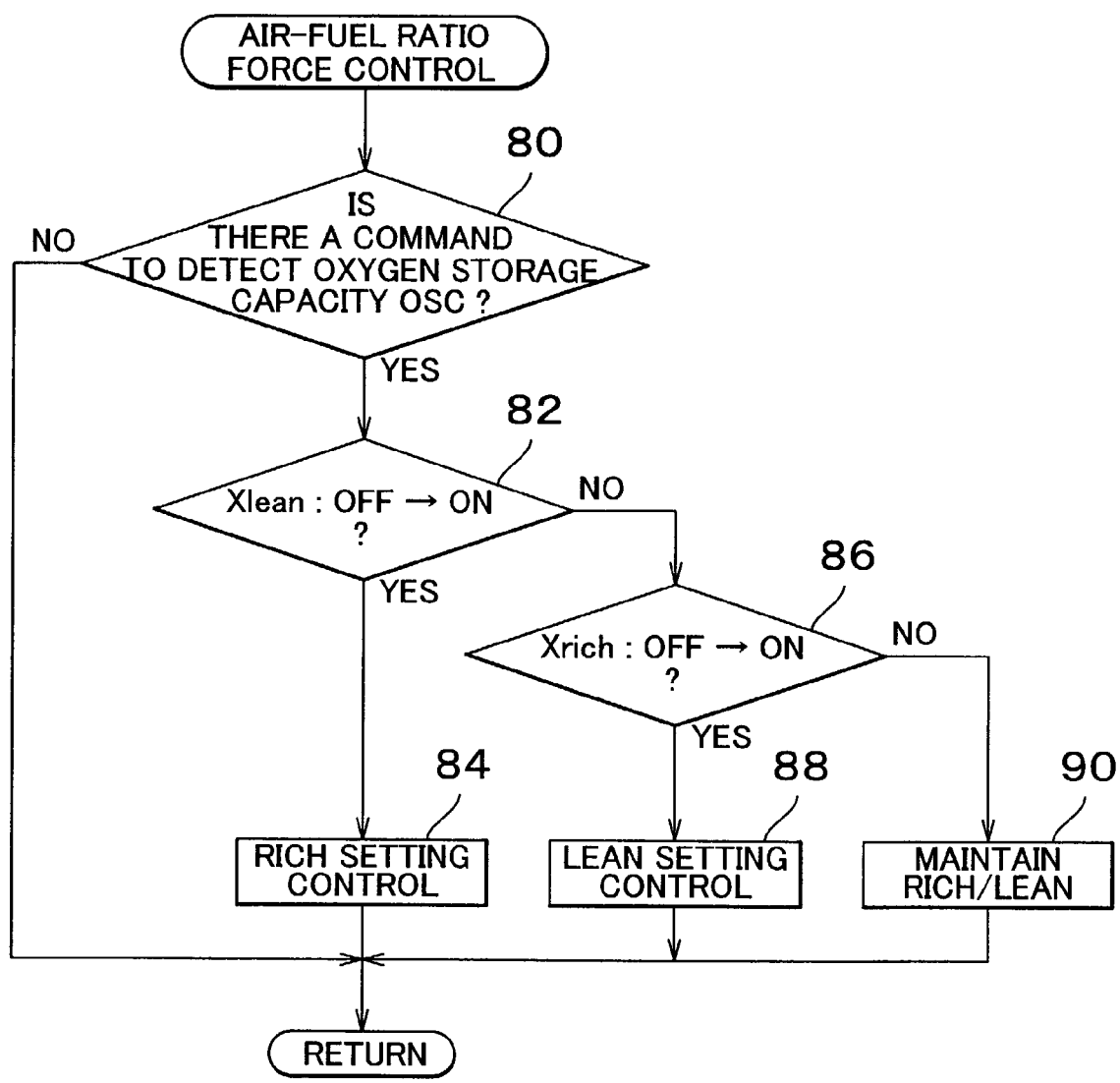
FIG. 2 is a flowchart of an air-fuel ratio force-control routine executed according to the first exemplary embodiment of the invention.

FIG. 2 is a flowchart of an air-fuel ratio force-control routine that the ECU 42 executes in order to detect the oxygen storage capacity OSC of the upstream side catalyst 32.

In the routine in FIG. 2, it is first determined whether a command to detect the oxygen storage capacity OSC has been generated (Step 80).

When it is determined that a command to detect the oxygen storage capacity OSC has not been generated, the present cycle ends without proceeding on to the following processes. On the other hand, when it is detected that a command to detect the oxygen storage capacity OSC has been generated, it is next determined whether a lean flag Xlean has switched from OFF to ON (Step 82).

The lean flag Xlean is a flag that is ON while the first oxygen sensor 38 generates an output (hereinafter referred to as a "lean output") that exceeds the lean determination value (see FIG. 4, Step 114). Accordingly, the determination in the Step 82 is YES when the output of the first oxygen sensor 38 changes from a value below the lean determination value to a value equal to, or greater than, the lean determination value during the period from the most recent process cycle through the current process cycle. In the routine shown in FIG. 2, when this determination is YES, control is then performed that fixes the air-fuel ratio of the mixture supplied to the internal combustion engine 10 at a predetermined value on the rich side (Step 84).

On the other hand, when the determination in Step 82 is NO, i.e., if the lean flag Xlean has not switched from OFF to ON, it is next determined whether a rich flag Xrich switched from OFF to ON (Step 86).

The rich flag Xrich is a flag that is ON while the first oxygen sensor 38 generates an output (hereinafter referred to as "rich output") that is below the rich determination value (See FIG. 4, Step 118). Accordingly, the determination in Step 86 is YES when the output of the first oxygen sensor 38 changes from a value above the rich determination value to a value equal to, or less than, the rich determination value during the period from the most recent process cycle through the current process cycle. In the routine shown in FIG. 2, when the determination is YES, control is then performed that fixes the air-fuel ratio of the mixture at a predetermined value on the lean side (Step 88).

On the other hand, when the determination in Step 86 is NO, i.e., when the rich flag Xrich has not switched from OFF to ON, rich fixed control or lean fixed control is performed according to the air-fuel ratio of the mixture used up to this time. More specifically, when the air-fuel ratio up to the present has been rich, control is performed so as to fix the air-fuel ratio at a predetermined value on the rich side, just as in Step 84. On the other hand, when the air-fuel ratio up to the present has been lean, control is performed so as to fix the air-fuel ratio at a predetermined value on the lean side (Step 88).

FIG. 3 is a timing chart for explaining an operation to be realized by having the ECU 42 execute the routine shown in FIG. 2. More specifically, FIG. 3A shows a change generated in the output of the air-fuel ratio sensor 36 while detecting the oxygen storage capacity OSC. Also, FIG. 3B shows a change generated in the output of the first oxygen sensor 38 at that time as well.

According to the routine shown in FIG. 2, described above, when a command to detect the oxygen storage capacity OSC is generated, the air-fuel ratio of the mixture is fixed at a predetermined value on the rich side or the lean side by the process in Step 90. FIG. 3 shows a case in which the air-fuel ratio has been fixed at a predetermined value on the rich side until time t0. While the air-fuel ratio of the mixture is fixed to be fuel rich, the output of the air-fuel ratio sensor 36 becomes a value that tends toward the rich side, as shown in FIG. 3A. During that time, the upstream side catalyst 32 purifies the exhaust gas by discharging stored oxygen into it.

When all of the oxygen that was stored in the upstream side catalyst 32 has been discharged, the exhaust gas within the upstream side catalyst 32 is no longer purified so exhaust gas with a shortage of oxygen that contains HC and CO begins to flow out through the downstream side of the upstream side catalyst 32. When exhaust gas with a shortage of oxygen begins to flow out downstream of the upstream side catalyst 32, the output from the first oxygen sensor 38 becomes a value that is smaller than a rich determination value Vr which indicates that the exhaust gas is fuel rich. Therefore, by monitoring the output of the first oxygen sensor 38 it is possible to detect when exhaust gas with a shortage of oxygen begins to flow out downstream of the upstream side catalyst 32, i.e., to detect when the oxygen within the upstream side catalyst 32 has been depleted. In FIG. 3B, time t0 corresponds to that time.

When the output from the first oxygen sensor 38 becomes smaller than the rich determination value Vl, the rich flag Xrich at that time turns ON (Step 86), and the air-fuel ratio of the mixture is forced to be fixed at a predetermined value on the lean side (Step 88). After the air-fuel ratio of the mixture is fixed at the predetermined value on the lean side, the output from the air-fuel ratio sensor 36 then becomes a value that tends toward the lean side. The wave shape shown in FIG. 3A shows that output at time t1 in a state in which it has reversed to a value tending toward the lean side.

As the output from the air-fuel ratio sensor 36 tends toward the fuel lean side, i.e., as the exhaust gas with excess oxygen flows into the upstream side catalyst 32, the upstream side catalyst 32 purifies that exhaust gas by storing that excess oxygen. As this continues, the oxygen storage capacity OSC of the upstream side catalyst 32 gradually becomes full with the stored oxygen until it is no longer able to purify the exhaust gas in this way.

When this happens, exhaust gas with an excess of oxygen that contains NOx begins to flow out the downstream side of the upstream side catalyst 32. When the exhaust gas with an excess of oxygen begins to flow out downstream of the upstream side catalyst 32, the output from the first oxygen sensor 38 becomes a value larger than a lean determination value Vl which indicates that the exhaust gas is fuel lean. Therefore, by monitoring the output of the first oxygen sensor 38 it is possible to detect when exhaust gas with an excess of oxygen begins to flow out downstream of the upstream side catalyst 32, i.e., to detect when the oxygen storage capacity OSC of the upstream side catalyst 32 has become full with stored oxygen. In FIG. 3B, time t2 corresponds to that time (the time when the oxygen storage capacity OSC of the upstream side catalyst 32 has become full with stored oxygen).

When the output from the first oxygen sensor 38 becomes larger than the lean determination value Vl, the lean flag Xlean at that time turns ON (Step 82) and the air-fuel ratio of the mixture is forced to be fixed at the predetermined value on the rich side (Step 84). After the air-fuel ratio of the mixture is fixed at the predetermined value on the rich side, the output from the air-fuel ratio sensor 36 then becomes a value that tends toward the rich side. The wave shape shown in FIG. 3A shows that output at time t3 in a state in which it has reversed to a value tending toward the rich side.

Thereafter, the catalyst deterioration detecting apparatus keeps the air-fuel ratio of the mixture fuel rich until the output from the first oxygen sensor 38 becomes smaller than the rich determination value Vr again. Then when the output from the first oxygen sensor 38 becomes smaller than the rich determination value Vr (time t4), the process after time t0 is performed repeatedly. As a result, the upstream side catalyst 32 continuously switches back and forth between a state in which it has completely discharged all of the stored oxygen (minimum stored oxygen state) and a state in which the oxygen storage capacity OSC of the upstream side catalyst 32 is full with stored oxygen (maximum stored oxygen state).

The amount of oxygen that the upstream side catalyst 32 stores per unit/time, or the amount of oxygen that the upstream side catalyst 32 discharges per unit/time, is obtained based on the air-fuel ratio of the exhaust gas and the intake air amount Ga. Hereinafter, the amounts of both stored oxygen as a positive value and discharged oxygen as a negative value will be referred to as "amount of stored oxygen O2AD". The catalyst deterioration detecting apparatus according to the exemplary embodiment calculates the oxygen storage capacity OSC by integrating the amount of stored oxygen O2AD in the process of shifting from the minimum stored oxygen state to the maximum stored oxygen state or vice versa.

Figure 4:
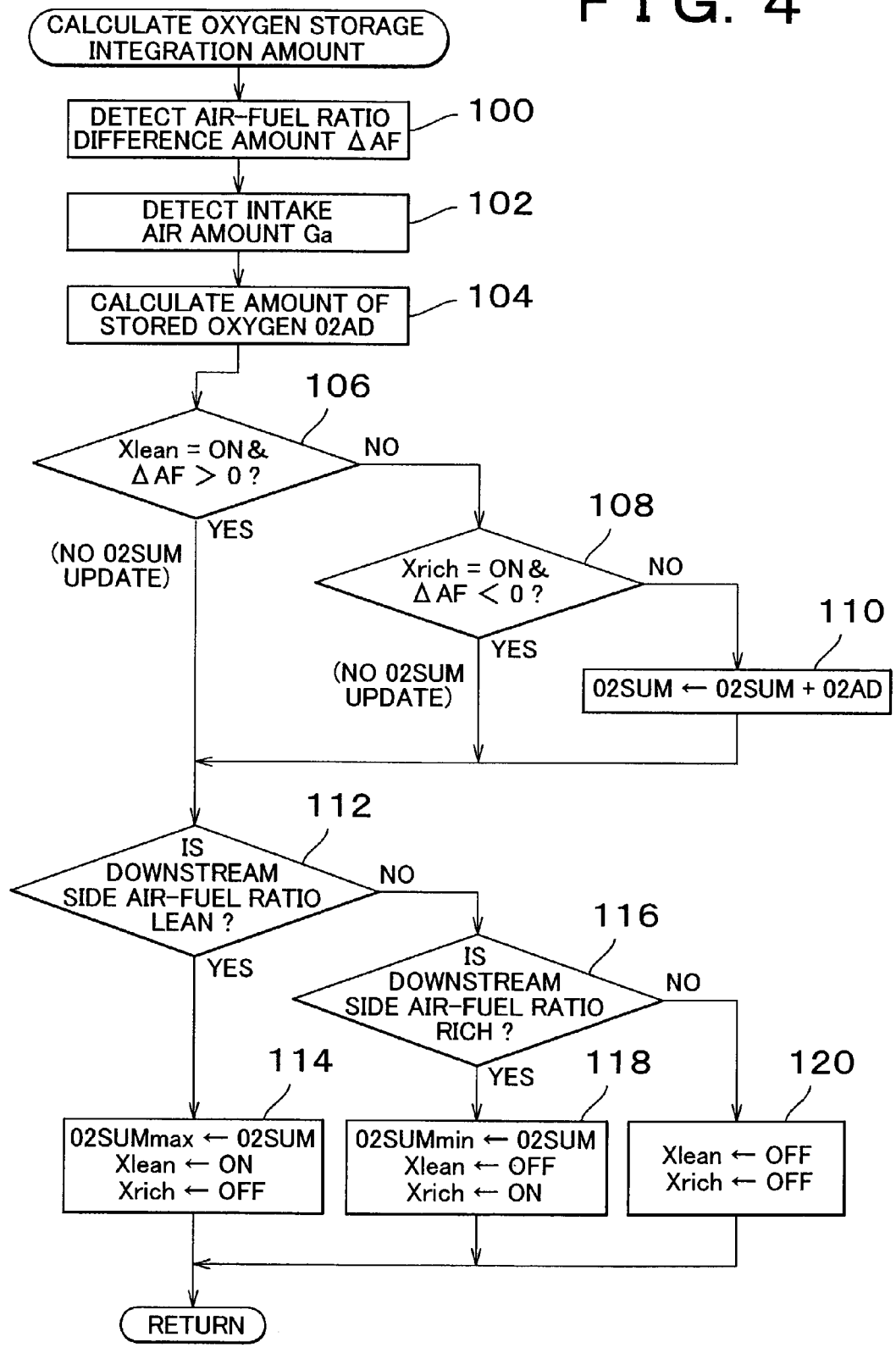
FIG. 4 is a flowchart of a routine for calculating an oxygen storage integration amount to be executed according to the first exemplary embodiment of the invention.

FIG. 4 is a flowchart of a routine for calculating the amount of stored oxygen, which is executed by the ECU 42 as a prerequisite for obtaining the oxygen storage capacity OSC. The routine shown in FIG. 4 is a regular interrupt routine that is performed repeatedly at predetermined intervals of time.

In the routine shown in FIG. 4, an air-fuel ratio difference amount $\Delta A/F$ is first calculated (Step 100). The air-fuel ratio difference amount $\Delta A/F$ is the difference between the air-fuel ratio A/F detected by the air-fuel ratio sensor 36, i.e., the air-fuel ratio A/F of the exhaust gas flowing into the upstream side catalyst 32, and the stoichiometric air-fuel ratio A/Fst, and is obtained by the following expression.

$$\Delta A/F = A/F - A/Fst \quad (1)$$

Next, the intake air amount Ga is detected based on the output from the airflow meter 20 (Step 102).

Then the amount of oxygen stored in the upstream side catalyst 32 per unit/time, or the amount of oxygen discharged from the upstream side catalyst 32 per unit/time, i.e., the amount of stored oxygen O2AD, is obtained based on the air-fuel ratio difference amount $\Delta A/F$ and the intake air amount Ga (Step 104).

The amount of stored oxygen O2AD is calculated according to a map stored in the ECU 42 or an operational expression. The value of the amount of stored oxygen O2AD is positive when the air-fuel ratio of the exhaust gas flowing into the upstream side catalyst 32 is lean (when $A/F > A/Fst$, i.e., $\Delta A/F > 0$). Conversely, the value of the amount of stored oxygen O2AD is negative when the air-fuel ratio of the exhaust gas flowing into the upstream side catalyst 32 is rich (when $A/F < A/Fst$, i.e., $\Delta A/F < 0$).

Next, it is determined whether the conditions in which lean flag Xlean=0 and $\Delta A/F > 0$ have been fulfilled (Step 106).

The lean flag Xlean is a flag that turns ON when the first oxygen sensor 38 generates a lean output, as described above. Accordingly, it is determined in step 106 whether the exhaust gas is lean (i.e., there is excess oxygen) both upstream and downstream of the upstream side catalyst 32.

The determination in Step 106 is YES between times t2 and t3 shown in FIG. 3, for example. That is, the conditions for this are fulfilled when the oxygen storage capacity OSC of the upstream side catalyst 32 is full with stored oxygen and there is no change in that stored amount. In the routine shown in FIG. 4, the processes after Step 112 are performed soon after these conditions have been fulfilled.

Conversely, when the determination in Step 106 is NO, it is then determined whether both of the conditions in which the rich flag Xrich=ON and the $\Delta A/F < 0$ have been fulfilled (Step 108).

The rich flag Xrich is a flag that turns ON when the first oxygen sensor 38 generates a rich output, as described above. Accordingly, it is determined in Step 108 whether the exhaust gas is rich both upstream and downstream of the upstream side catalyst 32.

The conditions of Step 108 are fulfilled between times t0 and t1 shown in FIG. 3, for example. That is, the conditions are fulfilled when the upstream side catalyst 32 has discharged all of its stored oxygen and there is no change in that stored amount. In the routine shown in FIG. 4, the processes after Step 112 are performed soon after these conditions have been fulfilled.

When the determination in Step 108 is NO, the upstream side catalyst 32 is actually storing or discharging oxygen so it can be determined that the amount of oxygen stored in the upstream side catalyst 32 is continuously changing. In this case, in the routine shown in FIG. 4, a process for updating an oxygen storage integration amount O2SUM is performed by adding the amount of stored oxygen O2AD calculated in the current process cycle to the oxygen storage integration amount O2SUM that was calculated in the most recent process cycle (Step 110). This process in Step 110 enables the oxygen storage integration amount O2SUM to be selectively increased or decreased according to the amount of oxygen actually stored in the upstream side catalyst 32.

In the routine shown in FIG. 4, it is next determined whether exhaust gas with a lean air-fuel ratio is flowing out downstream of the upstream side catalyst 32. More specifically, it is determined whether the first oxygen sensor 38 is generating a lean output (Step 112).

The first oxygen sensor 38 only generates a lean output when the upstream side catalyst 32 is in a maximum stored oxygen state and a fuel lean mixture is being supplied to the internal combustion engine 10. When it is determined in Step 112 in the routine shown in FIG. 4 that the first oxygen sensor 38 is generating a lean output, the oxygen storage integration amount O2SUM that is calculated at that point is stored as a maximum oxygen storage integration amount O2SUMmax. Then a process to turn the lean flag Xlean ON and the rich flag Xrich OFF is performed (Step 114).

When it is determined in Step 112 that exhaust gas having a lean air-fuel ratio is not flowing out from the downstream side of the upstream side catalyst 32, it is then determined whether exhaust gas having a rich air-fuel ratio is flowing out downstream of the upstream side catalyst 32, i.e., whether the first oxygen sensor 38 is generating a rich output (Step 116).

The first oxygen sensor 38 only generates a rich output when the upstream side catalyst 32 is in the minimum stored oxygen state and a fuel rich mixture is being supplied to the internal combustion engine 10. When it is determined in Step 116 in the routine shown in FIG. 4 that the first oxygen sensor 38 is generating a rich output, the oxygen storage integration amount O2SUM that is calculated at that point is stored as a minimum oxygen storage integration amount O2SUMmin. Then the process to turn the lean flag Xlean OFF and the rich flag Xrich ON is performed (Step 118).

When it is determined in Step 116 that exhaust gas having a rich air-fuel ratio is not flowing out from the downstream side of the upstream side catalyst 32, it can be determined that the upstream side catalyst 32 is purifying the exhaust gas suitably, i.e., that the upstream side catalyst 32 is neither in the maximum stored oxygen state nor in the minimum stored oxygen state. In this case, both the lean flag Xlean and the rich flag Xrich are turned OFF (Step 120).

As described above, the routine shown in FIG. 4 enables the oxygen storage integration amount O2SUM to be selectively increased or decreased according to an increase or decrease in the amount of oxygen actually stored in the upstream side catalyst 32. The oxygen storage integration amount O2SUM corresponding to the maximum stored oxygen state can then be stored as the maximum oxygen storage integration amount O2SUMmax and the oxygen storage integration amount O2SUM corresponding to the minimum stored oxygen state can then be stored as the minimum oxygen storage integration amount O2SUMmin. When these values are obtained, the ECU 42 is able to calculate the oxygen storage capacity OSC of the upstream side catalyst 32 by subtracting the minimum oxygen storage integration amount O2SUMmin from the maximum oxygen storage integration amount O2SUMmax.

However, in the system in this exemplary embodiment, exhaust gas with an excess of oxygen containing NOx flows out downstream of the upstream side catalyst 32 for a certain period of time after the upstream side catalyst 32 has reached the maximum stored oxygen state. Further, exhaust gas with a shortage of oxygen containing HC and CO flows out downstream of the upstream side catalyst 32 for a certain period of time after the upstream side catalyst 32 has reached the minimum stored oxygen state.

Because the catalyst deterioration detecting apparatus of this exemplary embodiment is provided with the downstream side catalyst 34 downstream of the upstream side catalyst 32, unpurified exhaust gas that flows out downstream of the upstream side catalyst 32 is not ordinarily discharged into the atmosphere. However, when the downstream side catalyst 34 is in the maximum stored oxygen state or the minimum stored oxygen state such that it is not able to display its original purification performance, any unpurified exhaust gas that flows out downstream of the upstream side catalyst 32 passes right through the downstream side catalyst 34 and is discharged as it is into the atmosphere. Therefore, according to this exemplary embodiment, a series of processes for detecting deterioration of the upstream side catalyst 32, i.e., a series of processes including a process for forcing the upstream side catalyst 32 into the maximum stored oxygen state or minimum stored oxygen state are performed only when the downstream side catalyst 34 is able to display appropriate purification performance.

Hereinafter, the contents of the specific processes performed by the catalyst deterioration detecting apparatus according to this exemplary embodiment to realize the aforementioned performance will be described with reference to FIG. 5 and FIG. 6.

Figure 5:
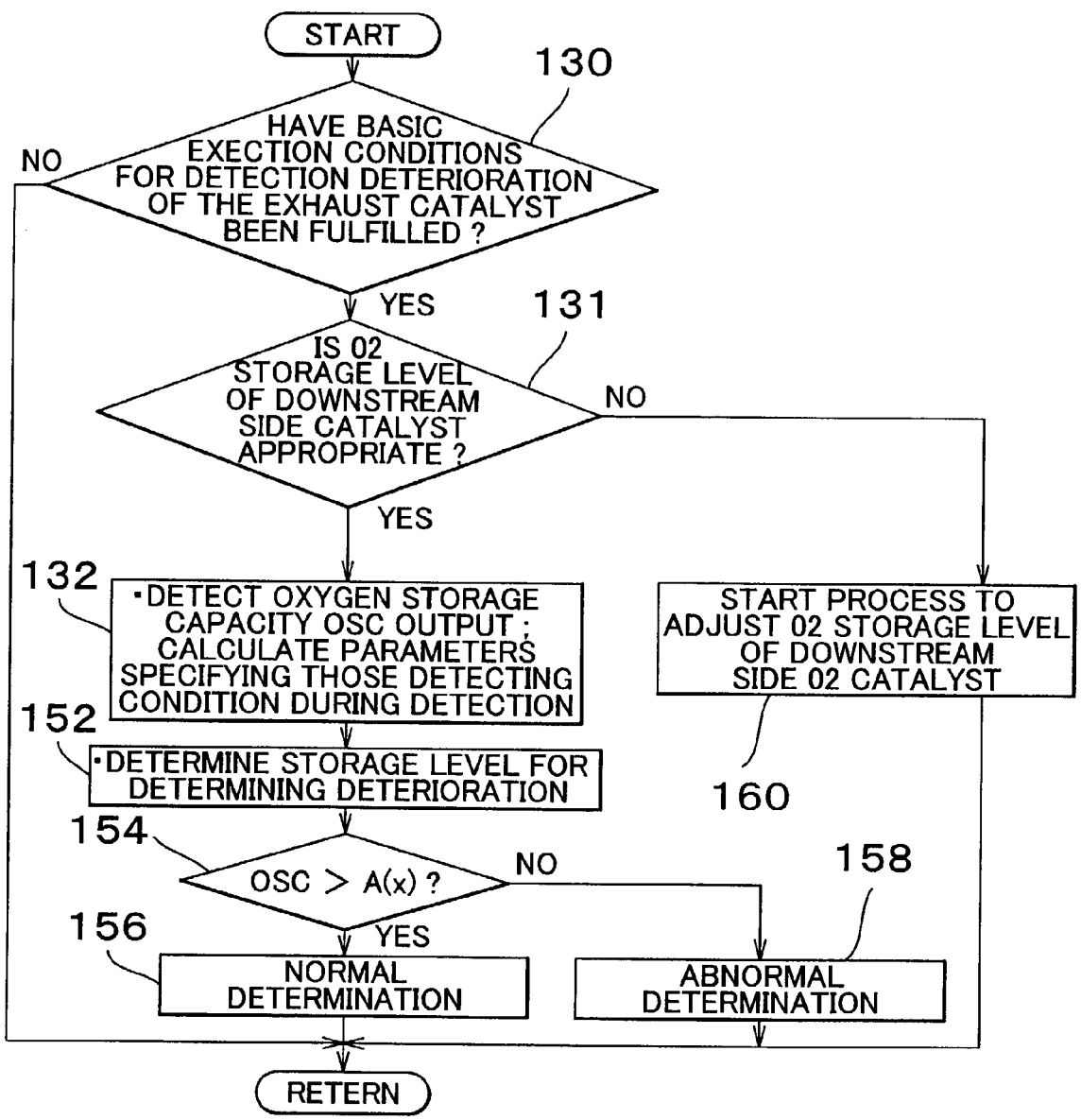
FIG. 5 is a flowchart of a routine to be executed in order to detect deterioration of the upstream side catalyst according to the first exemplary embodiment of the invention.

FIG. 5 is a flowchart of a routine executed to detect deterioration of the upstream side catalyst 32 under the aforementioned restriction of only when the downstream side catalyst 34 is able to display appropriate purification performance. In the routine shown in FIG. 5, it is first determined whether basic execution conditions for detecting deterioration of the exhaust catalyst have been fulfilled (Step 130).

More specifically, in Step 130 it is determined whether the intake air amount Ga is within a predetermined range or whether the catalyst temperature of the upstream side catalyst 32 is within a predetermined range. These ranges are predetermined as ranges over which there is a distinguishable difference between the oxygen storage capacity OSC of a normal catalyst and the oxygen storage capacity OSC of a deteriorated catalyst. When the conditions of Step 130 are not fulfilled, the current routine ends quickly without proceeding with any of the following processes.

However, when the basic execution conditions for detecting deterioration have been fulfilled, it is then determined whether the stored oxygen state of the downstream side catalyst 34 is appropriate, i.e., whether the stored oxygen state of the downstream side catalyst 34 is such that oxygen exceeding the predetermined amount is able to be further stored and whether oxygen exceeding the predetermined amount is able to be further discharged (Step 131).

Here, the predetermined amount of oxygen able to be further stored is an amount that is predetermined as the amount of oxygen sufficient to suitably purify exhaust gas having an excess of oxygen that flows into the downstream side catalyst 34 after the upstream side catalyst 32 has been forced into the maximum stored oxygen state in the process of detecting deterioration. Also, the predetermined amount of oxygen able to be further discharged is an amount that is predetermined as the amount of oxygen sufficient to suitably purify exhaust gas having a shortage of oxygen that flows into the downstream side catalyst 34 after the upstream side catalyst 32 has been forced into the minimum stored oxygen state in the process of detecting deterioration.

More specifically, the conditions of Step 131 are determined to be fulfilled depending on whether the output of the second oxygen sensor 40 disposed downstream of the downstream side catalyst 34 is a lean output or a rich output, i.e., whether the output of the second oxygen sensor 40 is a value between the lean determination value Vl and the rich determination value Vr. When the output of the second oxygen sensor 40 is a value that is between the lean determination value Vl and the rich determination value Vr, it is determined that the stored oxygen state of the downstream side catalyst 34 is appropriate. Next, the output of the oxygen storage capacity OSC of the upstream side catalyst 32 is detected and the parameters specifying those detecting conditions are calculated and the like (Step 132).

Figure 6:
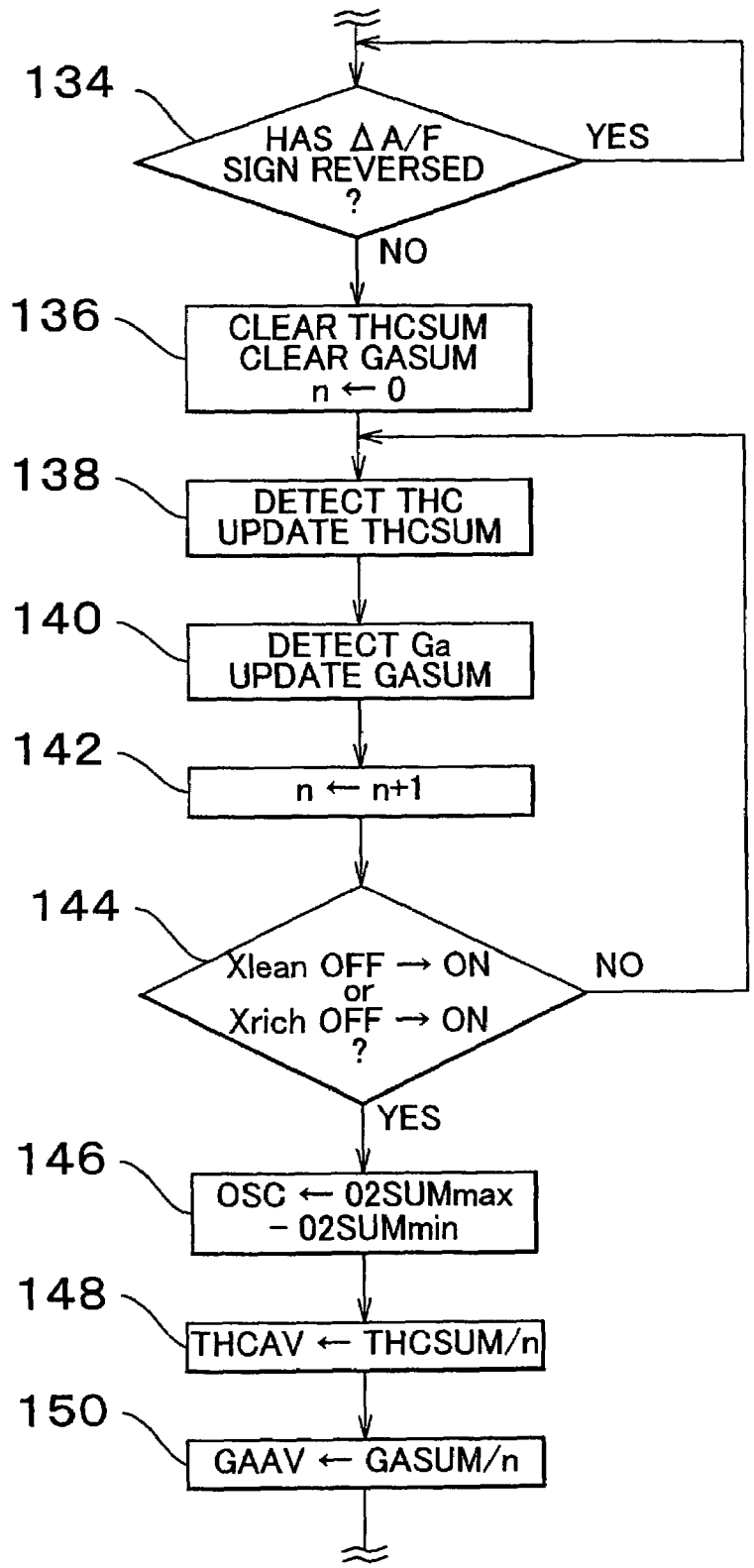
FIG. 6 is a flowchart of a series of processes to be executed in order to obtain the oxygen storage capacity and the like according to the first exemplary embodiment of the invention.

More specifically, the process of Step 132 is done by a series of processes shown in FIG. 6. According to the series of processes shown in FIG. 6, the oxygen storage capacity OSC of the upstream side catalyst 32 is detected while the mean catalyst temperature during detection and the mean intake air amount during detection are calculated as parameters specifying the conditions for that detection. Here, the mean catalyst temperature during detection is the mean value of the temperature of the upstream side catalyst 32 while the oxygen storage capacity OSC is being detected. Also, the mean intake air amount during detection is the mean value of the intake air amount Ga that is generated while the oxygen storage capacity OSC is being detected.

In the series of processes shown in FIG. 6, it is first determined whether the sign of the air-fuel ratio difference amount $\Delta A/F$ is reversed, i.e., whether the air-fuel ratio A/F that is detected by the air-fuel ratio sensor 36 has reversed from a value indicating fuel rich to a value indicating fuel lean or vice versa (Step 134).

As described with reference to FIG. 3, according to the system in this exemplary embodiment, the upstream side catalyst 32 is maintained in either the maximum stored oxygen state or the minimum stored oxygen state from after the first oxygen sensor 38 generates a rich output or a lean output (e.g., time t0 or t2) until the sign of the air-fuel difference amount $\Delta A/F$ reverses (e.g., time t1 or t3). After the sign of the air-fuel difference amount $\Delta A/F$ has reversed, the oxygen storage integration amount O2SUM which indicates the amount of oxygen stored in the upstream side catalyst 32 starts to be updated. Accordingly, the process of Step 134 enables detection of the time when the oxygen storage integration amount O2SUM starts to be updated.

The process in Step 134 is performed repeatedly until it is determined that the sign of the air-fuel difference amount $\Delta A/F$ has reversed, i.e., until it is determined that the oxygen storage integration amount 02SUM has started to be updated. Then when it is determined that the sign of the air-fuel difference amount ΔA/F has reversed, a catalyst temperature integration value THCSUM and a intake air amount integration value GASUM, both to be described later, are then cleared and an integration count number n, also to be described later, is reset to 0 (Step 136).

Next, a catalyst temperature THC is detected, and further, the catalyst temperature integration value THCSUM is updated based on that detected value (Step 138).

The catalyst temperature THC is the temperature of the upstream side catalyst 32 according to actual measurement or estimation. For actual measurement, the catalyst temperature THC can be detected by adding a catalyst temperature sensor to the upstream side catalyst 32. For estimation, the catalyst temperature THC can be detected according to a previously prepared map or operational expression based on the ignition timing, the air-fuel ratio A/F of the mixture, the intake air amount Ga, vehicle speed SPD, and intake air temperature THA, and the like. The catalyst temperature integration value THCSUM is a value in which the catalyst temperature THC detected in the current process cycle is added to the value at the time of the most recent process cycle.

Next, the intake air amount Ga is detected, and further, the intake air amount integration value GASUM is updated based on that detected value (Step 140).

The intake air amount Ga is a value that has actually been measured with the airflow meter 20. Also, the intake air amount integration value GASUM is a value in which the intake air amount Ga detected in the current process cycle is added to the value at the time of the most recent process cycle.

Next, the integration count number n is incremented (Step 142). The integration count number n is a value indicating the number of times that the processes in Step 138 and Step 140 have been repeated from this kind of processing.

In the series of processes shown in FIG. 6, it is next determined whether the lean flag Xlean has changed from OFF to ON, or whether the rich flag Xrich has changed from OFF to ON (Step 144).

As described with reference to FIG. 4, according to the system in this exemplary embodiment, the lean flag Xlean changes from OFF to ON when the first oxygen sensor 38 generates a lean output (see Step 114). Also, the rich flag Xrich changes from OFF to ON when the first oxygen sensor 38 generates a rich output (see Step 118). These changes occur immediately after the upstream side catalyst 32 has reached the maximum stored oxygen state or the minimum stored oxygen state. Accordingly, the process of Step 144 enables detection of the time when the upstream side catalyst 32 has reached the maximum stored oxygen state or the minimum stored oxygen state.

In the series of processes shown in FIG. 6, when it has been determined that the conditions of Step 144 have not been fulfilled, the processes after Step 138 are performed again. Then the processes of Steps 138 through 144 are performed repeatedly until it is determined that those conditions have been fulfilled.

When it has been determined in Step 144 that the lean flag Xlean has changed from OFF to ON or the rich flag Xrich has changed form OFF to ON, the oxygen storage capacity OSC is calculated according to the following expression (Step 146).

$$OSC = O2SUMmax - O2SUMmin \qquad (2)$$

As described with reference to FIG. 4, according to the system in this exemplary embodiment, the maximum oxygen storage integration amount 02SUMmax is calculated at the time when the lean flag Xlean changes from OFF to ON (see Step 114). Also, the minimum oxygen storage integration amount 02SUMmin is calculated at the time when the rich flag Xrich changes from OFF to ON (see Step 118). The process of Step 146 enables the oxygen storage capacity OSC to be calculated every time one of the maximum oxygen storage integration amount 02SUMmax and the minimum oxygen storage integration amount 02SUMmin has been updated to a new value using that new value.

In the series of processes shown in FIG. 6, after the process of Step 146 a mean catalyst temperature during detection THCAV is calculated. More specifically, as shown in the following expression, the mean catalyst temperature during detection THCAV is calculated by dividing the catalyst temperature integration value THCSUM calculated in Step 138 by the integration count number n (Step 148).

$$THCAV = THCSUM/n \qquad (3)$$

Next, an intake air amount mean value during detection GAAV is calculated. More specifically, the intake air amount mean value during detection GAAV is calculated by dividing the intake air amount integration value GASUM calculated in Step 140 by the integration count number n, as shown in the following expression (Step 150).

$$GAAV = GASUM/n \qquad (4)$$

As described above, the series of processes shown in FIG. 6 enables the oxygen storage capacity OSC to be calculated based on the newest data immediately after the upstream side catalyst 32 reaches the maximum stored oxygen state or the minimum stored oxygen state. The series of processes shown in the FIG. 6 also enables the mean catalyst temperature during detection THCAV and the intake air amount mean value during detection GAAV that were generated in the process in which that new oxygen storage capacity OSC is obtained to be obtained.

The series of processes shown in FIG. 6 is performed in Step 132 in the routine shown in FIG. 5, as described above.

In the routine shown in FIG. 5, when the process of Step 132 ends, a threshold A(x) for determining deterioration is then decided based on the mean catalyst temperature during detection THCAV and the intake air amount mean value during detection GAAV (Step 152).

The ECU 42 stores a map in which the threshold for distinguishing between an oxygen storage capacity OSC of the deteriorated catalyst and an oxygen storage capacity OSC of a normal catalyst has been set based on the relationship between the catalyst temperature and the intake air amount.

In the routine shown in FIG. 5, it is then determined whether the oxygen storage capacity OSC detected in the current process cycle is larger than the threshold A(x) decided on in Step 152 (Step 154).

The upstream side catalyst 32 is determined to be normal when it is determined that OSC>threshold A(x) is fulfilled (Step 156).

Conversely, the upstream side catalyst 32 is determined to be deteriorated when it is determined that OSC>threshold A(x) is not fulfilled (Step 158).

In the routine shown in FIG. 5, when it is determined in Step 131 that the stored oxygen state is not appropriate, i.e., that the output of the second oxygen sensor 40 is either a rich output or a lean output, it can be determined that the downstream side catalyst 34 is in either the maximum stored oxygen state or the minimum stored oxygen state. That is, it can be determined that the downstream side catalyst 34 is not in a state where it can purify unpurified exhaust gas. In this case, in the routine shown in FIG. 5, a process for detecting deterioration of the upstream side catalyst 32, i.e., a process for forcing the upstream side catalyst 32 into the maximum stored oxygen state or the minimum stored oxygen state, is prohibited. A command is then issued to start an adjustment process to make the stored oxygen state of the downstream side catalyst 34 appropriate (Start 160).

The above adjusting process is performed by another routine that is different from the routine shown in FIG. 5. In that adjusting process, it is first determined whether the downstream side catalyst 34 is in the maximum stored oxygen state or the minimum stored oxygen state based on the output from the second oxygen sensor 40. When it is determined that the downstream side catalyst 34 is in the maximum stored oxygen state, a process is performed to force the air-fuel ratio of the mixture supplied to the internal combustion engine 10 to a predetermined value on the rich side. As this continues, exhaust gas having a shortage of oxygen is gradually supplied to the downstream side catalyst 34, which enables the downstream side catalyst 34 to be brought out of the maximum stored oxygen state. Conversely, when it is determined that the downstream side catalyst 34 is in the minimum stored oxygen state, a process is performed to force the air-fuel ratio of the mixture supplied to the internal combustion engine 10 to a predetermined value on the lean side. As this continues, exhaust gas having an excess of oxygen is gradually supplied to the downstream side catalyst 34, which enables the downstream side catalyst 34 to be brought out of the minimum stored oxygen state.

With this adjusting process, after the downstream side catalyst 34 has been brought out of the maximum stored oxygen state or the minimum stored oxygen state, it is determined in Step 131 at the start of the routine shown in FIG. 5 that the stored oxygen state of the downstream side catalyst 34 is appropriate. Then, by the processes of Steps 132 through 158, it is determined whether the upstream side catalyst 32 is normal such that it does not discharge unpurified exhaust gas into the atmosphere, i.e., such that it does not make the exhaust emissions worse, or whether the upstream side catalyst 32 is deteriorating.

As described above, according to the catalyst deterioration detecting apparatus of this exemplary embodiment, it is possible to perform the series of processes to detect deterioration of the upstream side catalyst 32 only when the stored oxygen state of the downstream side catalyst 34 is appropriate. Then, when the stored oxygen state of the downstream side catalyst 34 is not appropriate, it is possible to actively put the downstream side catalyst 34 into an appropriate stored oxygen state. Therefore, the catalyst deterioration detecting apparatus of this exemplary embodiment enables deterioration of the upstream side catalyst 32 to be detected with high accuracy without making the exhaust emissions worse.

In the foregoing exemplary Embodiment 1 an oxygen sensor was used for the sensor disposed between the upstream side catalyst 32 and the downstream side catalyst 34, as well as for the sensor disposed downstream of the downstream side catalyst 34. However, according to another exemplary embodiment, those sensors may also be air-fuel ratio sensors that indicate a change that is substantially linear with respect to the air-fuel ratio of the exhaust gas.

In the foregoing exemplary Embodiment 1, the first oxygen sensor 38 corresponds to the first oxygen sensor.

Step 112 that is performed by the ECU 42 corresponds to the maximum stored oxygen state detecting portion. Step 116 that is performed by the ECU 42 corresponds to the minimum stored oxygen state detecting portion. Steps 82 through 90 that are performed by the ECU 42 correspond to the force-rich portion and force-lean portion. Step 132 that is performed by the ECU 42 corresponds to the oxygen storage capacity detecting portion. Step 154 that is performed by the ECU 42 corresponds to the deterioration determining portion. Step 131 that is performed by the ECU 42 corresponds to the appropriate state determining portion and the determination-start allowing portion.

Further in the foregoing exemplary Embodiment 1, the process of Step 160 that is performed by the ECU 42 corresponds to the air-fuel ratio adjusting portion.

Also in the foregoing exemplary Embodiment 1, the determination in the adjusting process in Step 160 by the ECU 42 of whether the downstream side catalyst 34 is in the maximum stored oxygen state or in the minimum stored oxygen state corresponds to the oxygen storage limit detecting portion and the oxygen discharge limit detecting portion. Also, forcing the air-fuel ratio of the mixture by the ECU 42 according to the above determination result to a predetermined value on the rich side or to a predetermined value on the lean side corresponds to the rich side adjusting portion and the lean side adjusting portion.

Furthermore, in the foregoing exemplary Embodiment 1, the second oxygen sensor 40 corresponds to the second oxygen sensor. Also, the determination by the ECU 42 in Step 131 of whether the output of the second oxygen sensor 40 is a value between the lean determination valve Vl and the rich determination value Vr corresponds to the first determining portion, the second determining portion, and the determining portion.

Exemplary Embodiment 2

Next, a second exemplary embodiment of the invention will be described with reference to FIG. 7. In the figure, elements in exemplary Embodiment 2 that are the same as those in exemplary Embodiment 1 are denoted by the same reference numerals that they are denoted by in exemplary Embodiment 1, and redundant explanations thereof will be omitted. The catalyst deterioration detecting apparatus according to exemplary Embodiment 2 is the same as the apparatus in exemplary Embodiment 1 except in that the ECU 42 performs the routine shown in FIG. 7 in place of the aforementioned routine shown in FIG. 5. The apparatus according to exemplary Embodiment 1 determines the deterioration state of the upstream side catalyst 32 based on a single oxygen storage capacity OSC. In contrast, the catalyst deterioration detecting apparatus in exemplary Embodiment 2 determines whether the upstream side catalyst 32 is deteriorating based on a plurality of oxygen storage capacities OSC.

Figure 7:
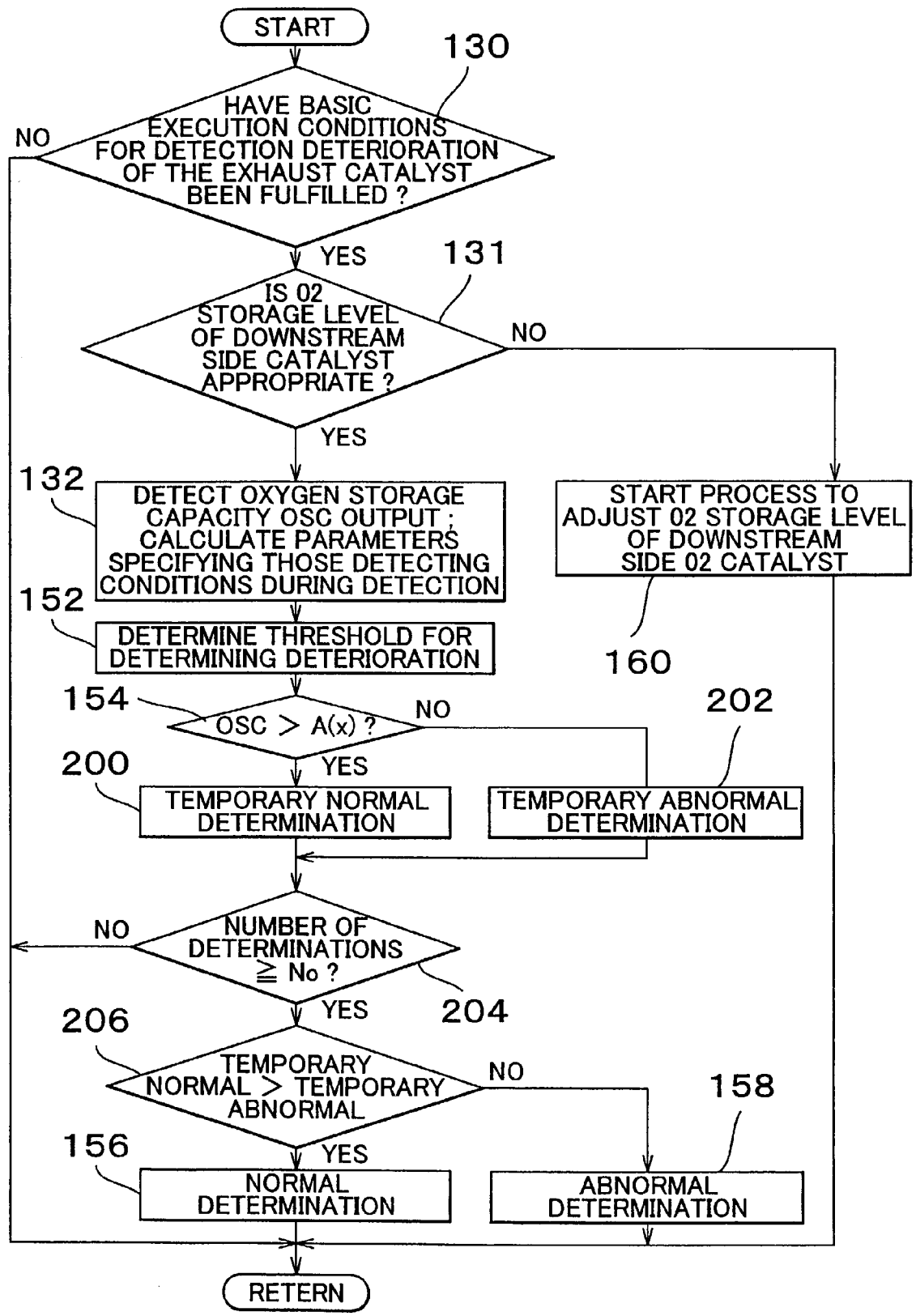
FIG. 7 is a flowchart of a routine to be executed in order to detect deterioration of the upstream side catalyst according to a second exemplary embodiment of the invention.

The routine shown in FIG. 7 is a flowchart of a routine performed by the ECU 42 in exemplary Embodiment 2 to realize the foregoing function. In FIG. 7, steps that are identical to those steps shown in FIG. 5 are denoted by the same reference numerals that they are denoted by in FIG. 5, and explanations thereof will be omitted or simplified.

In the routine shown in FIG. 7, when it is determined in Step 154 that the oxygen storage capacity OSC is greater than the threshold A(x), a temporary normal determination is made (Step 200).

Also, when it is determined in Step 154 that OSC>threshold A(x) is not fulfilled, a temporary abnormal determination is made (Step 202).

When these processes end, it is then determined whether the number of determinations in Step 154 has reached a predetermined number No (Step 204).

When it has been determined that the number of determinations has not yet reached the predetermined number No, the current process cycle then ends quickly. After a predetermined amount of time, the processes after Step 130 are then performed again. Conversely, when it is determined that the number of determinations has reached the predetermined number No, it is then determined by a majority between the number of temporary normal determinations and the number of temporary abnormal determinations whether the upstream side catalyst 32 is normal or abnormal (Steps 206, 156, and 158).

This process enables the state of the upstream side catalyst 32 to be determined based on a plurality of oxygen storage capacities OSC. Therefore, the apparatus according to exemplary Embodiment 2 can detect deterioration of the upstream side catalyst 32 with higher accuracy than the apparatus according to exemplary Embodiment 1 that determines the state of the upstream side catalyst 32 based only on a single oxygen storage capacity OSC.

Further, the above described process enables the process for detecting the oxygen storage capacity OSC to be temporarily stopped when the stored oxygen state of the downstream side catalyst 34 is off from the appropriate state before the oxygen storage capacity is detected the predetermined number No of times such that the adjusting process can be performed to return the downstream side catalyst 34 to the appropriate state (see Steps 130 and 161). Therefore, the catalyst deterioration detecting apparatus according to exemplary Embodiment 2 enables increased accuracy of deterioration determination without making the exhaust emissions any worse.

Exemplary Embodiment 3

Next, a third exemplary exemplary embodiment of the invention will be described with reference to FIG. 8. In the figure, the elements in exemplary Embodiment 3 that are the same as those in exemplary Embodiment 1 are denoted by the same reference numerals that they are denoted by in exemplary Embodiment 1, and redundant explanations thereof will be omitted. The catalyst deterioration detecting apparatus according to exemplary Embodiment 3 is the same as the apparatuses in exemplary Embodiments 1 and 2 except in that the ECU 42 performs the routine shown in FIG. 8 in place of the aforementioned routine shown in FIG. 5 or FIG. 7. The apparatus according to exemplary Embodiment 2 determines the deterioration state of the upstream side catalyst 32 by a majority of a plurality of temporary determinations that are based on specific oxygen storage capacities OSC. In contrast, the catalyst deterioration detecting apparatus in exemplary Embodiment 3 determines whether the upstream side catalyst 32 is normal based on whether the mean value of a plurality of oxygen storage capacities OSC exceeds the threshold A(x).

Figure 8:
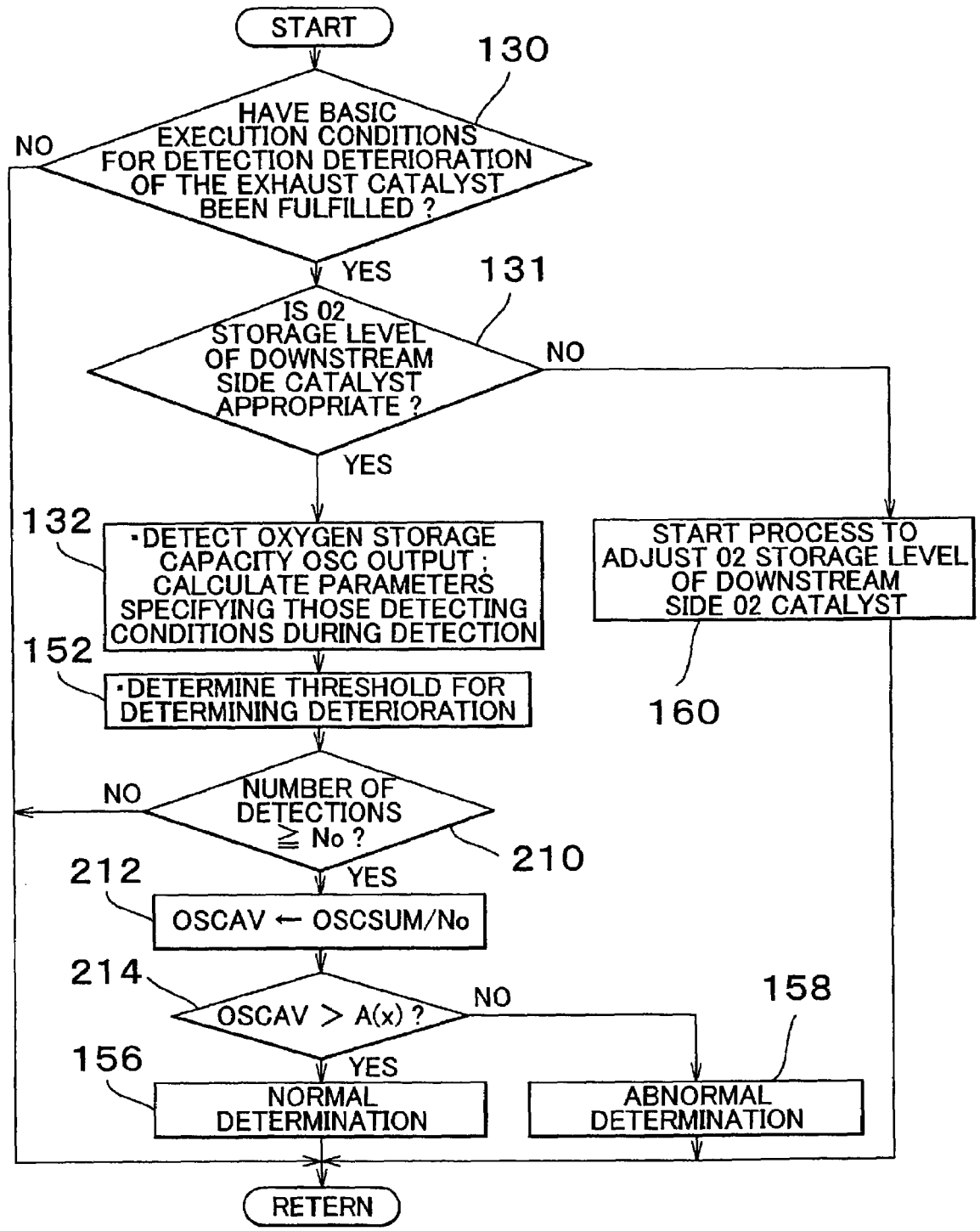
FIG. 8 is a flowchart of a routine to be executed in order to detect deterioration of the upstream side catalyst according to a third exemplary embodiment of the invention.

The routine shown in FIG. 8 is a flowchart of a routine performed by the ECU 42 in exemplary Embodiment 3 to realize the foregoing function. In FIG. 8, steps that are identical to those steps shown in FIG. 5 or 7 are denoted by the same reference numerals that they are denoted by in FIG. 5 or 7, and explanations thereof will be omitted or simplified.

In the routine shown in FIG. 8, it is determined after the processes of Steps 132 and 134 whether the number of detections of the oxygen storage capacity OSC has reached a predetermined number No (Step 210).

When it is determined that the number of detections has not yet reached the predetermined number No, the current process cycle ends quickly. Then after a predetermined amount of time, the processes after Step 130 are performed again. Conversely, when it is determined that the number of detections has reached the predetermined number No, an oxygen storage capacity mean value OSCAV is then calculated by dividing integration values OSCSUM of all of the oxygen storage capacities OSC that were detected by the number of detections No (Step 212).

As a result, when it is determined that OSCAV>threshold A(x) has been fulfilled, it is determined that the upstream side catalyst 32 is normal (Step 156). Conversely, when it is determined that OSCAV>threshold A(x) has not been fulfilled, it is determined that the upstream side catalyst 32 is abnormal (Step 158).

This process enables the state of the upstream side catalyst 32 to be determined based on a plurality of oxygen storage capacities OSC, or more specifically, based on the mean value OSCAV of those oxygen storage capacities OSC. Further, the above described process enables the process for detecting the oxygen storage capacity OSC to be temporarily stopped when the stored oxygen state of the downstream side catalyst 34 is different from the appropriate state before the oxygen storage capacity OSC is detected the predetermined number of times such that the adjusting process can be performed to return the downstream side catalyst 34 to the appropriate state (see Steps 131 and 160). Therefore, the catalyst deterioration detecting apparatus according to exemplary Embodiment 3 enables deterioration of the upstream side catalyst 32 to be detected with a high degree of accuracy without making the exhaust emissions any worse, just as with exemplary Embodiment 2.

Exemplary Embodiment 4

Next, a fourth exemplary embodiment of the invention will be described with reference to FIG. 9. In the figure, the elements in exemplary Embodiment 4 that are the same as those in exemplary Embodiment 1 are denoted by the same reference numerals that they are denoted by in exemplary Embodiment 1, and redundant explanations thereof will be omitted. The catalyst deterioration detecting apparatus according to exemplary Embodiment 4 is the same as any one of the apparatuses in exemplary Embodiments 1 through 3 except in that the ECU 42 performs the routine shown in FIG. 9 in place of the aforementioned routines shown in FIG. 5, 7, or 8.

Figure 9:
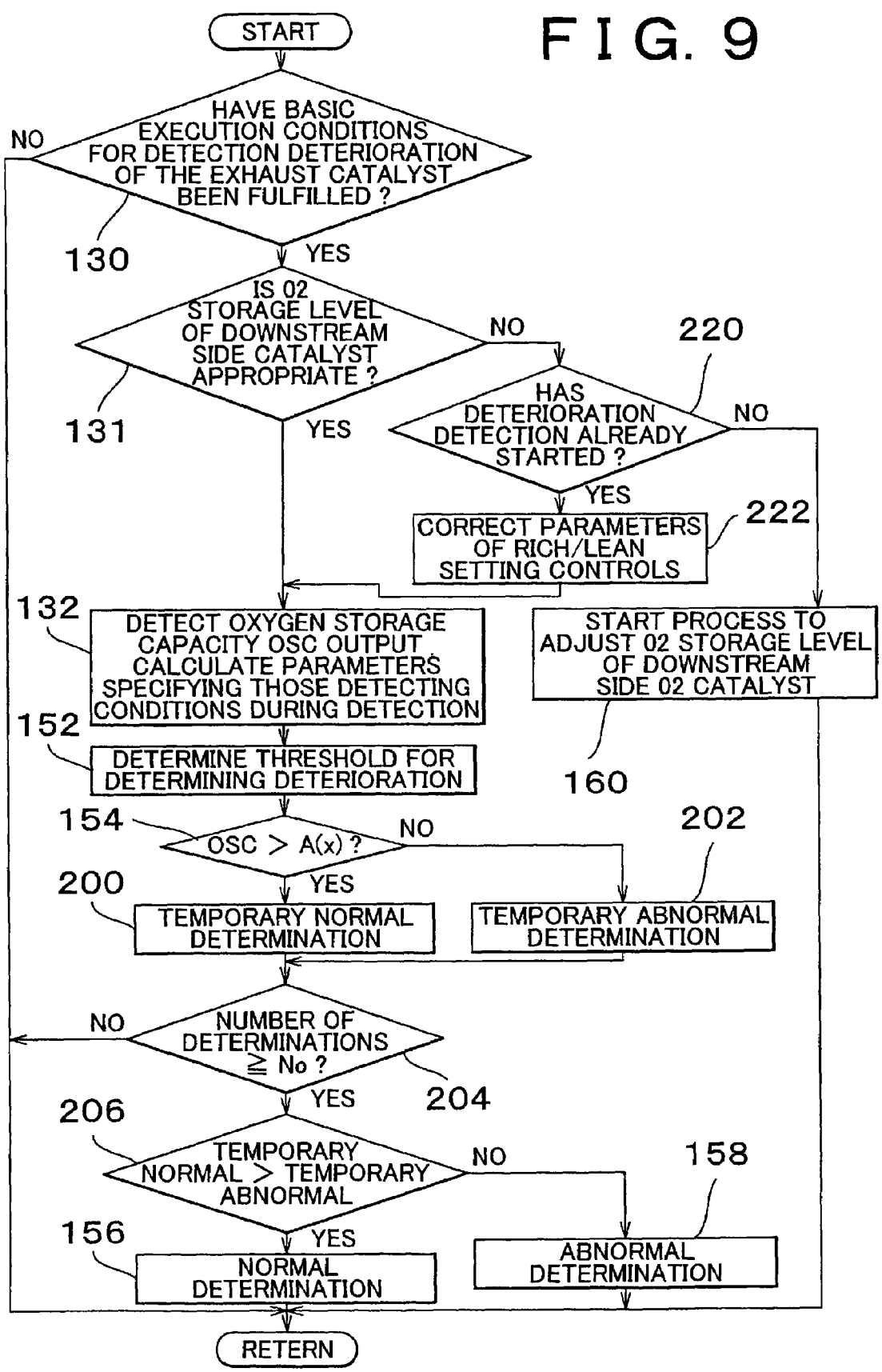
FIG. 9 is a flowchart of a routine to be executed in order to detect deterioration of the upstream side catalyst according to a fourth exemplary embodiment of the invention.

The routine shown in FIG. 9 is a flowchart of a routine performed by the ECU 42 in exemplary Embodiment 4 to detect deterioration of the upstream side catalyst 32. This routine is the same as the routine shown in FIG. 7 that is performed in exemplary Embodiment 2 except in that the processes of Steps 200 and 222 are performed after Step 131.

That is, in the routine shown in FIG. 9, when it is determined in Step 131 that the stored oxygen state of the downstream side catalyst 34 is not appropriate, it is then determined whether deterioration determination of the upstream side catalyst 32 has already started (Step 220).

In this routine, deterioration of the upstream side catalyst 32 is determined by a majority of a plurality of temporary determinations that are based on the oxygen storage capacities OSC, just as in the routine shown in FIG. 7. In Step 220, it is determined whether detection of the first oxygen storage capacity OSC has already started. When the stored oxygen state of the downstream side catalyst 34 is not appropriate at the stage when the first oxygen storage capacity OSC is detected, it is determined in Step 220 that deterioration determination has not started. In this case, the process of Step 160 is then performed after this such that the adjusting process to make the stored oxygen state of the downstream side catalyst 34 appropriate is started. Then, at the point when the stored oxygen state of the downstream side catalyst 34 is appropriate, the processes for detecting the oxygen storage capacity OSC of the upstream side catalyst 32 (the processes after Step 132) are started.

During the period of time after the first process to detect the oxygen storage capacity OSC has started until the oxygen storage capacity OSC has been detected a predetermined number No of times, the stored oxygen state of the downstream side catalyst 34 may differ from the appropriate state. When this happens, Step 220 is performed after Step 131 in the routine shown in FIG. 9, and it is determined that deterioration determination of the upstream side catalyst 32 has already started (Step 220).

When it is determined in Step 220 that deterioration determination of the upstream side catalyst 32 has already started, parameters for the rich setting control and the lean setting control are then corrected (Step 222).

The catalyst deterioration detecting apparatus of this exemplary embodiment forces the air-fuel ratio to oscillate by repeatedly alternating between rich setting control and lean setting control when the oxygen storage capacity OSC of the upstream side catalyst 32 is being detected, just like the apparatus of exemplary Embodiment 1 (see FIG. 2). Rich setting control forcibly sets the air-fuel ratio to a predetermined value on the rich side and lean setting control forcibly sets the air-fuel ratio to a predetermined value on the lean side. In Step 222, the parameters used for these controls, respectively, are corrected in accordance with the stored oxygen state of the upstream side catalyst 32.

More specifically, in Step 222, it is first determined whether the upstream side catalyst 32 is in the maximum stored oxygen state or in the minimum stored oxygen state based on the output of the second oxygen sensor 40. When it is determined that the downstream side catalyst 34 is in the maximum stored oxygen state, the target air-fuel ratio on the rich side with the rich setting control is set to a value tending sufficiently towards the rich side compared with the stoichiometric air-fuel ratio, and the target air-fuel ratio on the lean side with the lean setting control is set to a value tending sufficiently towards the lean side compared with the stoichiometric air-fuel ratio. By setting the target air-fuel ratios this way, exhaust gas with an extreme shortage of oxygen flows into the downstream side catalyst 34 after the downstream side catalyst 34 has reached the minimum stored oxygen state. Conversely, exhaust gas with an extreme excess of oxygen flows into the downstream side catalyst 34 after the downstream side catalyst 34 has reached the maximum stored oxygen state. Therefore, by repeating the rich setting control and the lean setting control in this state, it is possible to bring the downstream side catalyst 34 out of the maximum stored oxygen state or minimum stored oxygen state such that the downstream side catalyst 34 is able to be returned to the appropriate stored oxygen state.

In Step 222, when it is determined that the downstream side catalyst 34 is in the minimum stored oxygen state, the target air-fuel ratio on the rich side for the rich setting control is set to a value tending slightly toward the rich side compared with the stoichiometric air-fuel ratio, and the target air-fuel ratio on the lean side for the lean setting control is set to a value tending slightly toward the lean side compared with the stoichiometric air-fuel ratio. In this case, the rich setting control and the lean setting control are repeated so as to bring the downstream side catalyst 34 out of the minimum stored oxygen state and return it to the appropriate stored oxygen state.

In the routine shown in FIG. 9, the process in Step 132 is performed after the process in Step 222 is performed. As a result, the rich setting control and the lean setting control are repeatedly performed under the conditions set in Step 220 such that the downstream side catalyst 34 is returned to a normal state in which almost no unpurified exhaust gas flows out into the atmosphere.

In this way, according to the routine shown in FIG. 9, even if the downstream side catalyst 34 is in an inappropriate state in the process of detecting the oxygen storage capacity OSC a predetermined number of times, it is possible to continue with the detection of the oxygen storage capacity OSC without making the exhaust emissions worse. Accordingly, the catalyst deterioration detecting apparatus of exemplary Embodiment 4 enables deterioration of the upstream side catalyst 32 to be detected accurately and within a short amount of time without losing the good exhaust emissions characteristics.

According to exemplary Embodiment 4, in Step 222, the target air-fuel ratio for the rich setting control and the target air-fuel ratio for the lean setting control are corrected. However, the parameters corrected in Step 222 are not limited to this. That is, in Step 222, the time from after the first oxygen sensor 38 generates a rich output or a lean output until the air-fuel ratio of the mixture reverses, and the like, may also be corrected.

More specifically, when the downstream side catalyst 34 is in the maximum stored oxygen state, the time from after the first oxygen sensor 38 generates a rich output until the air-fuel ratio becomes lean may be made relatively long, and the time from after the first oxygen sensor 38 generates a lean output until the air-fuel output becomes rich may be made short. Also, when the downstream side catalyst 34 is in the minimum stored oxygen state, the above settings may be reversed. Shortening the time until the air-fuel ratio becomes rich enables a large amount of exhaust gas having a shortage of oxygen to be supplied to the downstream side catalyst 34, therefore enabling the downstream side catalyst 34 to be quickly brought out of the maximum stored oxygen state. Also, shortening the time until the air-fuel ratio becomes lean enables a large amount of exhaust gas having an excess of oxygen to be supplied to the downstream side catalyst 34, therefore enabling the downstream side catalyst 34 to be quickly brought out of the minimum stored oxygen state.

Further, according to exemplary Embodiment 4 above, when detection of the initial oxygen storage capacity OSC begins after adjusting the stored oxygen state of the downstream side catalyst 34 to the appropriate state and the downstream side catalyst 34 changes to an inappropriate state after that detection begins, the parameters of the rich setting control and the lean setting control are corrected. However, the invention is not limited to this. For example, when the downstream side catalyst 34 is in an inappropriate state at the point when the initial oxygen storage capacity OSC is to be detected, the parameters of the rich setting control and the lean setting control can also be corrected at that point.

In exemplary Embodiment 4, Step 204 that is performed by the ECU 42 corresponds to the control repeating portion, Step 206 corresponds to the deterioration determining portion, and Steps 220 and 222 correspond to the air-fuel ratio force-correcting portion.

Moreover, in exemplary Embodiment 4, the first oxygen sensor 38 corresponds to the first oxygen sensor. Step 112 that is performed by the ECU 42 corresponds to the maximum stored oxygen state detecting portion. Step 116 that is performed by the ECU 42 corresponds to the minimum stored oxygen state detecting portion. Steps 82 through 90 that are performed by the ECU 42 correspond to the force-rich portion and the force-lean portion. Step 132 that is performed by the ECU 42 corresponds to the oxygen storage capacity detecting portion. Step 154 that is performed by the ECU 42 corresponds to the deterioration determining portion. Step 131 that is performed by the ECU 42 corresponds to the appropriate state determining portion. Steps 220 and 222 that are performed by the ECU 42 correspond to the air-fuel ratio force-correcting portion.

Exemplary Embodiment 5

Next, a fifth exemplary embodiment of the invention will be described with reference to FIG. 10. In the figure, the elements in exemplary Embodiment 5 that are the same as those in exemplary Embodiment 1 are denoted by the same reference numerals that they are denoted by in exemplary Embodiment 1, and redundant explanations thereof will be omitted. The catalyst deterioration detecting apparatus according to exemplary Embodiment 5 is the same as any one of the apparatuses in exemplary Embodiments 1 through 4 except in that the ECU 42 performs the routine shown in FIG. 10 in place of the aforementioned routine shown in FIG. 5, 7, 8, or 9.

Figure 10:
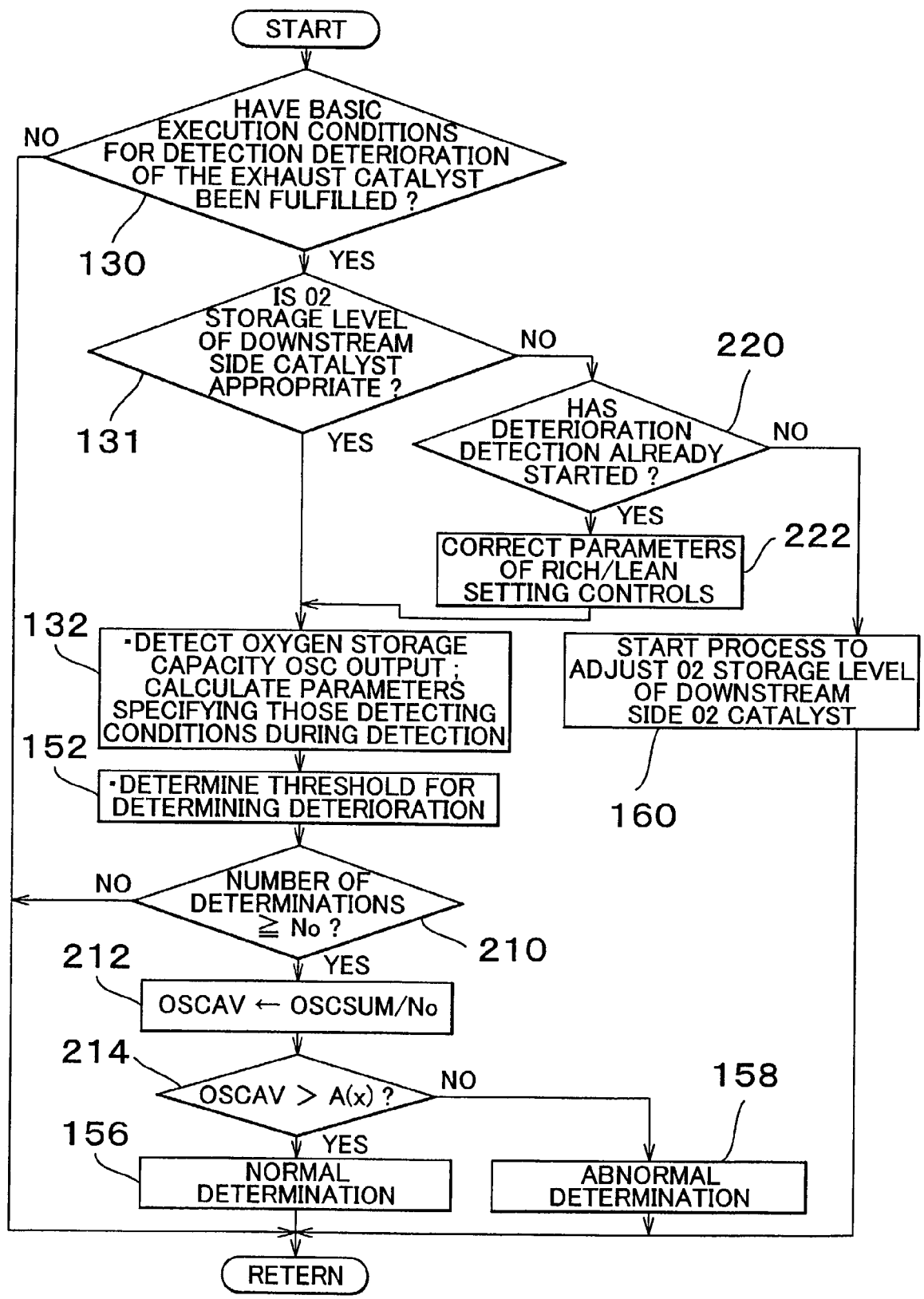
FIG. 10 is a flowchart of a routine to be executed in order to detect deterioration of the upstream side catalyst according to a fifth exemplary embodiment of the invention.

The routine shown in FIG. 10 is the same as the routine shown in FIG. 8 that is performed in exemplary Embodiment 3 except in that the processes of Steps 200 and 222 are performed after Step 131. The processes in Steps 200 and 222 shown in Step internal combustion engine 10 are the same as those processes performed in exemplary Embodiment 4.

In the routine shown in FIG. 10, initial processing in order to detect the oxygen storage capacity OSC can be started after the stored oxygen state of the downstream side catalyst 34 has been adjusted to the appropriate state, just as when the routine shown in FIG. 9 is performed. Then, if the downstream side catalyst 34 is in an inappropriate state before the oxygen storage capacity OSC is detected the predetermined number No of times, detection of the oxygen storage capacity OSC continues while the downstream side catalyst 34 is returned to the appropriate state with almost no unpurified exhaust gas flowing out into the atmosphere. Accordingly, the catalyst deterioration detecting apparatus of this exemplary embodiment enables deterioration of the upstream side catalyst 32 to be detected accurately and within a short amount of time without losing the good exhaust emissions characteristics, just as with exemplary Embodiment 4.

According to exemplary Embodiment 5, in Step 222 the target air-fuel ratio for the rich setting control and the target air-fuel ratio for the lean setting control are corrected. However, the parameters corrected in Step 222 are not limited to this. For example, in Step 222, the time from after the first oxygen sensor 38 generates a rich output or a lean output until the air-fuel ratio of the mixture reverses may also be corrected, just as was described in exemplary Embodiment 4.

Further, according to exemplary Embodiment 5, detection of the initial oxygen storage capacity OSC begins after the stored oxygen state of the downstream side catalyst 34 has been adjusted to an appropriate state. However, the invention is not limited to this. For example, when the downstream side catalyst 34 is in an inappropriate state at the point when the initial oxygen storage capacity OSC is to be detected, the parameters of the rich setting control and the lean setting control can also be corrected at that point (at the point when the initial oxygen storage capacity OSC is to be detected).

In exemplary Embodiment 5, Step 210 that is performed by the ECU 42 corresponds to the control repeating portion, Step 214 corresponds to the deterioration determining portion, and Steps 220 and 222 both correspond to the air-fuel ratio force-correcting portion.

Moreover in exemplary Embodiment 5, the first oxygen sensor 38 corresponds to the first oxygen sensor. Step 112 that is performed by the ECU 42 corresponds to the maximum stored oxygen state detecting portion. Step 116 that is performed by the ECU 42 corresponds to the minimum stored oxygen state detecting portion. Steps 82 through 90 that are performed by the ECU 42 correspond to the force-rich portion and the force-lean portion. Step 132 that is performed by the ECU 42 corresponds to the oxygen storage capacity detecting portion. Step 214 that is performed by the ECU 42 corresponds to the deterioration determining portion. Step 131 that is performed by the ECU 42 corresponds to the appropriate state determining portion. Steps 220 and 222 that are performed by the ECU 42 both correspond to the air-fuel ratio force-correcting portion.

Exemplary Embodiment 6

Next, a sixth exemplary embodiment of the invention will be described with reference to FIG. 11. In the figure, the elements in exemplary Embodiment 6 that are the same as those in exemplary Embodiment 1 are denoted by the same reference numerals that they are denoted by in exemplary Embodiment 1, and redundant explanations thereof will be omitted. The catalyst deterioration detecting apparatus according to exemplary Embodiment 6 has a construction in which the second oxygen sensor 40 is eliminated from the system configuration shown in FIG. 1. This is able to be accomplished by having the ECU 42 perform the routine shown in FIG. 11 in addition to the routine performed in any one of exemplary Embodiments 1 through 5 above.

In exemplary Embodiments 1 through 5, it is determined by the ECU 42 whether the stored oxygen state of the downstream side catalyst 34 is appropriate based on the output of the second oxygen sensor 40 (see Step 131). In contrast, the catalyst deterioration detecting apparatus according to exemplary Embodiment 6 estimates the amount of oxygen stored in the downstream side catalyst 34 according to a predetermined rule and then determines whether the downstream side catalyst 34 is in the appropriate state based on that estimated value.

Figure 11:
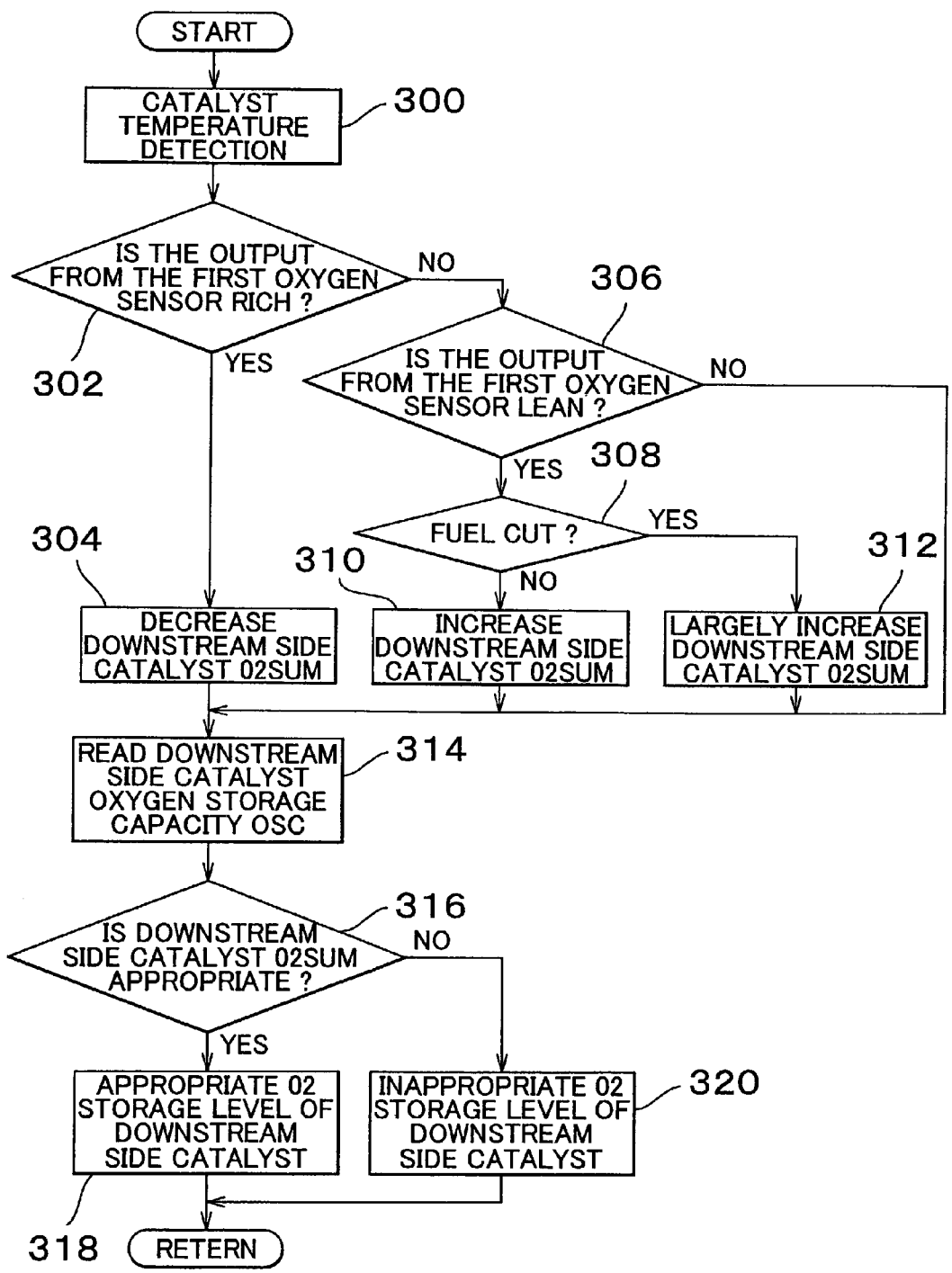
FIG. 11 is a flowchart of a routine to be executed in order to determine whether the downstream side catalyst is in an appropriate state according to a sixth exemplary embodiment of the invention.

FIG. 11 is a flowchart of a routine performed by the ECU 42 to realize the aforementioned function. In the routine shown in FIG. 11, the catalyst temperature of the downstream side catalyst 34 is first detected (Step 300).

The catalyst temperature of the downstream side catalyst 34 can be actually measured by adding a catalyst temperature sensor to the downstream side catalyst 34. The catalyst temperature of the downstream side catalyst 34 can also be detected according to a previously prepared map or operational expression based on the ignition timing, the air-fuel ratio A/F of the mixture, the intake air amount Ga, vehicle speed SPD, and intake air temperature THA, and the like. In Step 300, the catalyst temperature is detected according to these methods.

In the routine shown in FIG. 11, it is determined whether the first oxygen sensor 38 is generating a rich output, i.e., whether exhaust gas having a shortage of oxygen is flowing into the downstream side catalyst 34 (Step 302).

When it is determined that the first oxygen sensor 38 is generating a rich output, the oxygen storage integration amount 02SUM of the oxygen stored in the downstream side catalyst 34 is decreased according to a predetermined rule (Step 304).

A well-known model for estimating the oxygen storage integration amount 02SUM, for example, can be used as the predetermined rule. Also, more simply, the process in Step 304 can be performed after changing the first oxygen sensor 38 to an air-fuel ratio sensor or an HC sensor. That is, in this case, it is possible to calculate the oxygen discharge amount per unit/time based on the output of the air-fuel ratio sensor or the HC sensor and the intake air amount Ga. Then, the oxygen storage integration amount 02SUM can be appropriately updated by subtracting that calculated value from the oxygen storage integration amount 02SUM at the time of the most recent process cycle.

During the routine shown in FIG. 11, when it is determined in Step 302 that the first oxygen sensor 38 is not generating a rich output, it is then determined whether the first oxygen sensor 38 is generating a lean output (Step 306).

When it is determined that the first oxygen sensor 38 is generating a lean output, it is further determined whether a fuel cut is being performed (Step 308).

Then, when it is determined that a fuel cut is not being performed, the oxygen storage integration amount 02SUM of the oxygen stored in the downstream side catalyst 34 is increased according to a usual rule (Step 310).

Conversely, when it is determined that a fuel cut is being performed, the oxygen storage integration amount 02SUM of the oxygen stored in the downstream side catalyst 34 is increased according to a rule in which it is assumed that a fuel cut is being performed (Step 312).

The processes in Steps 310 and 312 can be performed using a well-known model, just as in Step 304 above. These processes can also be realized by calculating the amount of stored oxygen per unit/time after the first oxygen sensor 38 has been changed to an air-fuel sensor or an HC sensor, and then adding that calculated value to the oxygen storage integration amount 02SUM during the most recent process cycle.

When a fuel cut is being performed, air flows through the exhaust passage 14 such that the amount of stored oxygen per unit/time is larger than during normal driving. Therefore, according to this exemplary embodiment, the oxygen storage integration amount 02SUM is updated while distinguishing between when a fuel cut is being performed and when a fuel cut is not being performed, as described above. Accordingly, the system according to this exemplary embodiment is able to accurately estimate the oxygen storage integration amount 02SUM of the downstream side catalyst 34.

In the routine shown in FIG. 1, when it is determined in Step 306 that the first oxygen sensor 38 is not generating a lean output, it can be determined that exhaust gas which has neither an excess or shortage of oxygen is flowing into the downstream side catalyst 34. In this case, because no large increase or decrease is generated in the oxygen storage integration amount 02SUM, the process for updating the oxygen storage integration amount 02SUM is omitted.

When the series of processes described above ends, the oxygen storage integration amount 02SUM of the downstream side catalyst 34 is then read (Step 314).

Next, it is determined whether that oxygen storage integration amount 02SUM is an appropriate amount of stored oxygen for the downstream side catalyst 34. More specifically, it is determined whether the downstream side catalyst 34 is in a state in which it can suitably purify exhaust gas having either an excess or shortage of oxygen that flows into the downstream side catalyst 34 with the detection of deterioration of the upstream side catalyst 32 (Step 316).

Whether the oxygen storage integration amount 02SUM is an appropriate stored amount is to be determined by its relationship to the oxygen storage capacity of the downstream side catalyst 34. Here, the oxygen storage capacity of the downstream side catalyst 34 changes in accordance with the catalyst temperature. Therefore, the oxygen storage capacity of the downstream side catalyst 34 is first estimated based on the catalyst temperature detected in Step 300. Then after the oxygen storage capacity of the downstream side catalyst 34 is estimated, it is determined whether the oxygen storage integration amount 02SUM read in Step 314 is equal to, or greater than, a first integration value sufficient for purifying exhaust gas having a shortage of oxygen that may flow out from the downstream side catalyst 34. It is further determined whether the oxygen storage integration amount 02SUM read in Step 314 is equal to, or less than, a second integration value that has leeway for purifying exhaust gas having an excess of oxygen that may flow out from the downstream side catalyst 34.

When the oxygen storage integration amount 02SUM of the downstream side catalyst 34 is appropriate, it is determined that the downstream side catalyst 34 is in the appropriate state (State 318).

Conversely, when the oxygen storage integration amount 02SUM of the downstream side catalyst 34 is inappropriate, it is determined that the downstream side catalyst 34 is not in the appropriate state (Step 320).

As described above, according to the routine shown in FIG. 11, it is possible to determine whether the downstream side catalyst 34 is in the appropriate state without using the output from the second oxygen sensor 40. Therefore, the catalyst deterioration detecting apparatus according to exemplary Embodiment 6 is able to realize the same function as the apparatuses in exemplary Embodiments 1 through 5 despite the fact that it is not provided with the second oxygen sensor 40.

In exemplary Embodiment 6 above, Steps 302 through 312 that are performed by the ECU 42 correspond to the first estimating portion and the stored oxygen integration amount detecting portion, and Step 316 corresponds to the determining portion.

Further in exemplary Embodiment 6, Step 308 that is performed by the ECU 42 corresponds to the fuel cut detecting portion, and Step 312 corresponds to the second estimating portion.

Exemplary Embodiment 7

Next, the configuration of an internal combustion engine (engine) that is provided with a catalyst deterioration detecting apparatus according to a seventh exemplary embodiment of the invention, as well as the oxygen storage operation of the catalyst, will be described.

Figure 12:
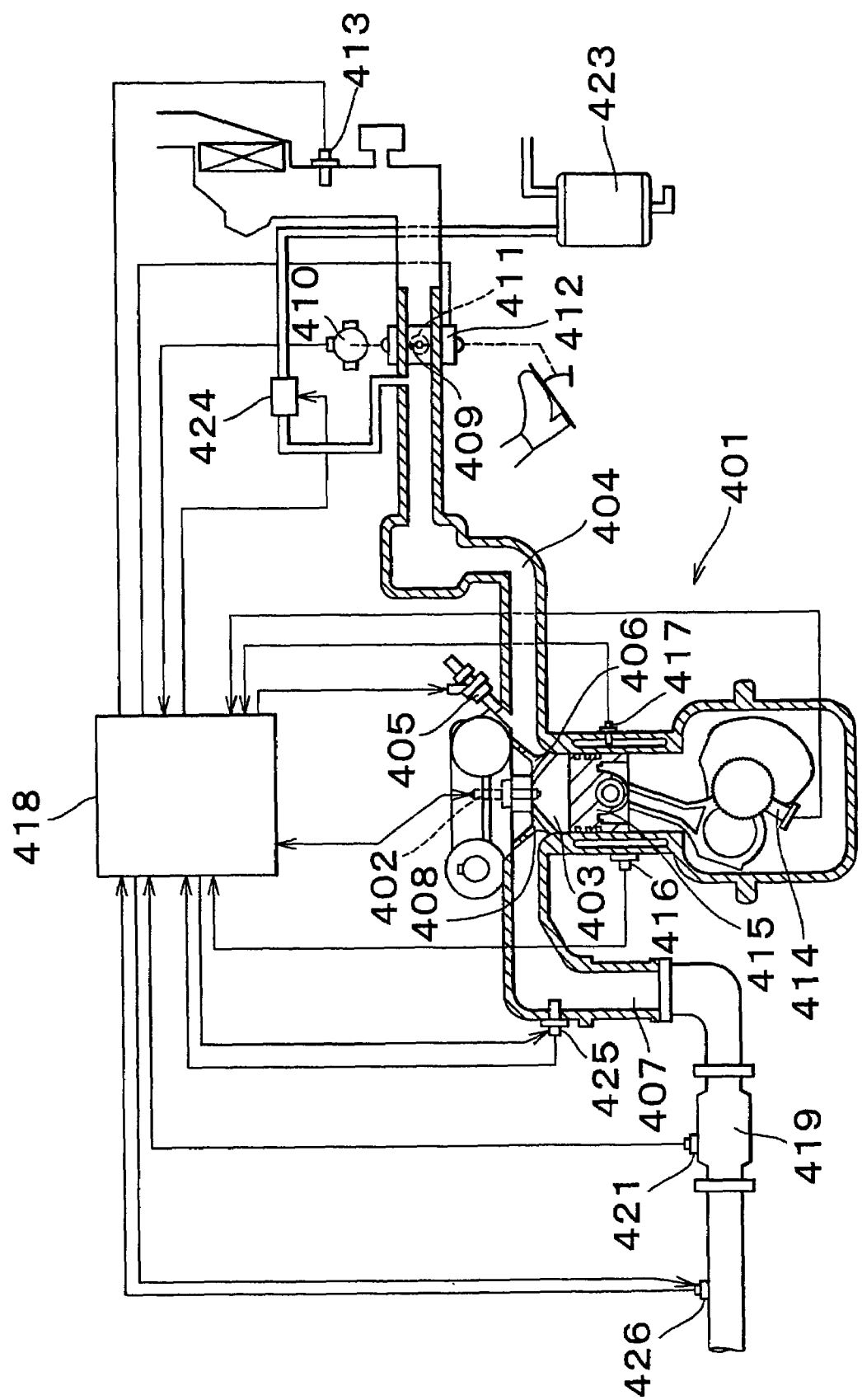
FIG. 12 is a cross-sectional view of an internal combustion engine with a catalyst deterioration detecting apparatus according to one exemplary embodiment of this invention.

FIG. 12 is a block diagram of an internal combustion engine having a catalyst deterioration detecting apparatus according to a seventh exemplary embodiment. The catalyst deterioration detecting apparatus according to this exemplary embodiment purifies the exhaust gas of an engine 401, which is an internal combustion engine. The engine 401 is an engine having multiple cylinders, but the figure shows the cross-section of only one of these cylinders. Referring to FIG. 12, the engine 401 generates a driving force by burning mixtures within each cylinder 403 using a spark plug 402. During combustion in the engine 401, air drawn in from the outside passes through the intake passage 404 and mixes with fuel injected from an injector 405 such that they are drawn into the cylinder 403 together as a mixture. The intake passage 404 and the inner portion of the cylinder 403 are connected and disconnected with the opening and closing of an intake valve 406. The mixture that is burned in the inner portion of the cylinder 403 is then exhausted into an exhaust passage 407 as exhaust gas. The exhaust passage 407 and the inner portion of the cylinder 403 are connected and disconnected by the opening and closing of an exhaust valve 408.

In the intake passage 404 is disposed a throttle valve 409 that adjusts the amount of intake air drawn into the cylinder 403. To the throttle valve 409 is connected a throttle position sensor 410 that detects the opening of the throttle valve 409. Further, the throttle valve 409 is connected also to a throttle motor 411 which provides a driving force that opens and closes the throttle valve 409. Near the throttle valve 409 is also disposed an accelerator position sensor 412 that detects an operating amount (accelerator opening) of an accelerator pedal. That is, in this case, an electronically controlled throttle method that electronically controls the opening of the throttle valve 409 is employed. Further, an airflow meter 413 for detecting the amount of intake air is also mounted on the intake passage 404.

A crank position sensor 414 that detects the position of a crankshaft is mounted near the crankshaft of the engine 401. The position of a piston 415 inside the cylinder 403, as well as an engine rotation speed NE, can also be obtained from the output of the crank position sensor 414. In addition, a knock sensor 416 that detects knocking of the engine 401 and a water temperature sensor 417 that detects a cooling water temperature are mounted in the engine 401.

A catalyst 419 is disposed in the exhaust passage 407. A plurality of these catalysts may also be provided in the exhaust passage, in which case the plurality may be provided in serial or in parallel in a branched portion. For example, in a four cylinder engine, one catalyst can be located in a place where exhaust pipes from two of the cylinders come together and another catalyst can be located in a place where exhaust pipes from the remaining two cylinders come together. In this exemplary embodiment, one catalyst 419 is disposed on the downstream side from the place where the exhaust pipes from each of cylinder 403 come together.

The spark plug 402, the injector 405, the throttle position sensor 410, the throttle motor 411, the accelerator position sensor 412, the airflow meter 413, the crank position sensor 414, the knock sensor 416, the water temperature sensor 417, and other sensors are all connected to an electronic control unit (ECU) 418 that comprehensively controls the engine 401. Those sensors are all controlled based on signals from the ECU 418, and detection results from these sensors are sent to the ECU 418. A catalyst temperature sensor 421 that measures the temperature of the catalyst 419 disposed in the exhaust passage 407, and a purge control valve 424 that purges the intake passage 404 of evaporated fuel in a fuel tank captured by a charcoal canister 423 are also connected to the ECU 418.

Further, an upstream side air-fuel ratio sensor 425 that is provided on the upstream side of the catalyst 419 and a downstream side air-fuel ratio sensor 426 that is provided on the downstream side of the catalyst 419 are also connected to the ECU 418. The upstream side air-fuel ratio sensor 425 detects an exhaust air-fuel ratio from the oxygen concentration in the exhaust gas at the place where it is located, and the downstream side air-fuel ratio sensor 426 detects the exhaust air-fuel ratio from the oxygen concentration in the exhaust gas at the place where it is located. As the upstream side air-fuel ratio sensor 425 and downstream side air-fuel ratio sensor 426, a linear air-fuel ratio sensor is used to detect the exhaust air-fuel ratio linearly and an oxygen sensor is used to detect the exhaust air-fuel ratio in an on-off manner. Also, because the upstream side air-fuel ratio sensor 425 and downstream side air-fuel ratio sensor 426 are unable to accurately detect the air-fuel ratio until they are above a certain temperature (activation temperature), the upstream side air-fuel ratio sensor 425 and downstream side air-fuel ratio sensor 426 are warmed up with power supplied via the ECU 418 so that their temperatures quickly rise to the activation temperature.

The ECU 418 includes in its inner portion a CPU that performs calculations, RAM that stores various types of information such as such as calculation results, backup RAM that stores that stored information with a battery, and ROM, in which is stored all of the control programs, and the like. The ECU 418 calculates the amount of oxygen stored in the catalyst 419 and controls the engine 401 based on the exhaust air-fuel ratio and the calculated amount of stored oxygen and the like. The ECU 418 also performs other various functions such as calculating the fuel injection amount to be injected by the injector 405, controlling the ignition timing of the spark plug 402, and performing model corrections, to be described later, as well as sensor diagnoses.

Hereinafter, detection (estimation) of the amount of stored oxygen and the oxygen storage capability will be described.

The catalyst used has a component of ceria ($CeO_2$) and the like, and has a property which stores and discharges oxygen in the exhaust gas in addition to a property which oxidizes and reduces components to be purified in the exhaust gas.

In exemplary Embodiment 7, the target value for the amount of stored oxygen of the catalyst is set so as to be able to handle cases in which the exhaust air-fuel ratio of the exhaust gas flowing into the catalyst becomes lean or rich. The amount of stored oxygen is controlled so as to match that same target value. With that same control, the amount of stored oxygen to be stored by the catalyst 419 is estimated, and the oxygen storage capability (also referred to as the storable amount of oxygen or the maximum oxygen storage amount or the like) is also estimated using the history of that estimated amount of stored oxygen.

Figure 13:
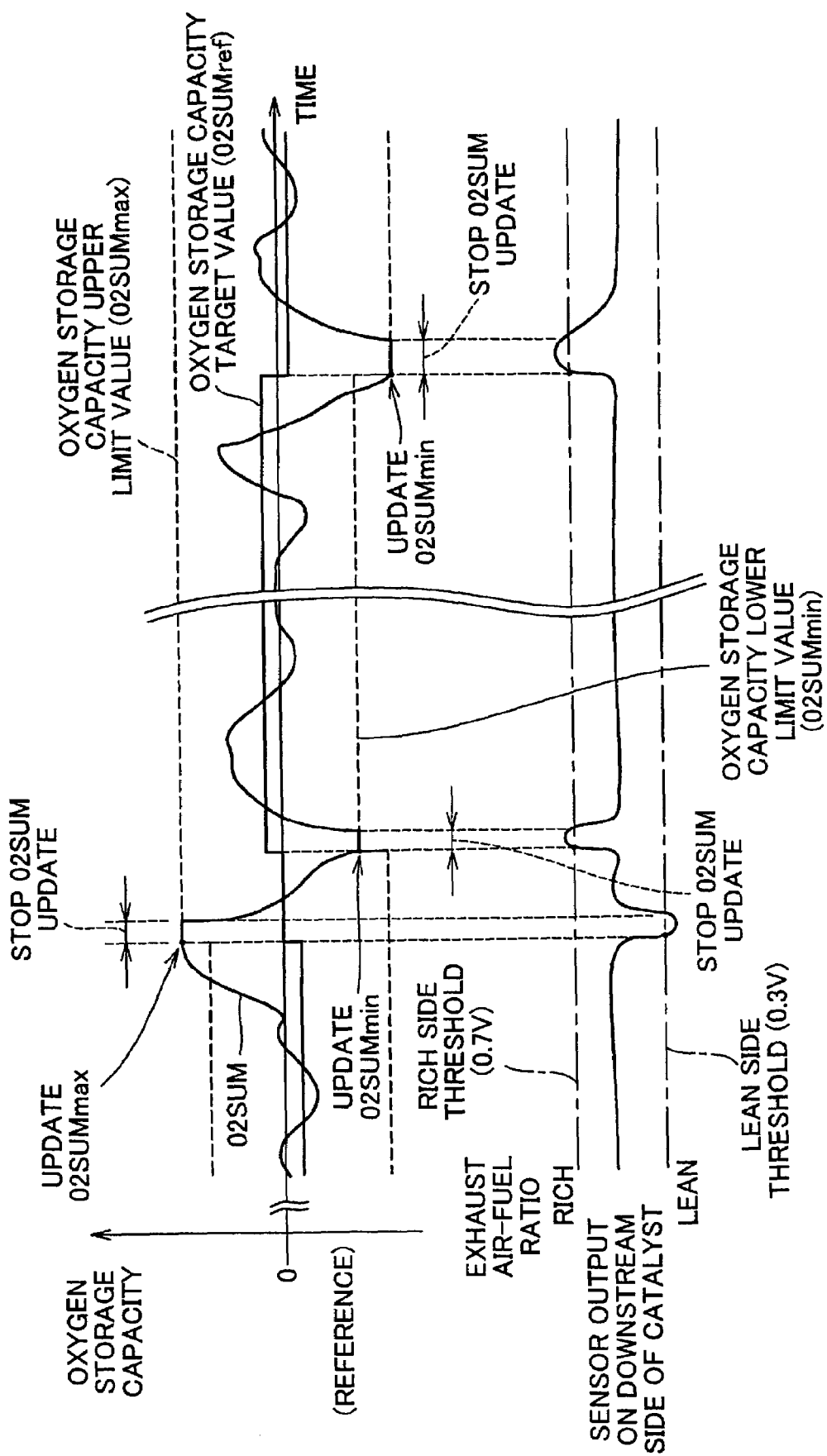
FIG. 13 is a timing chart showing an example of an oxygen storage integration amount of the catalyst, a reference value thereof, and an exhaust air-fuel ratio sensor output on the downstream side of the catalyst.
Figure 14:
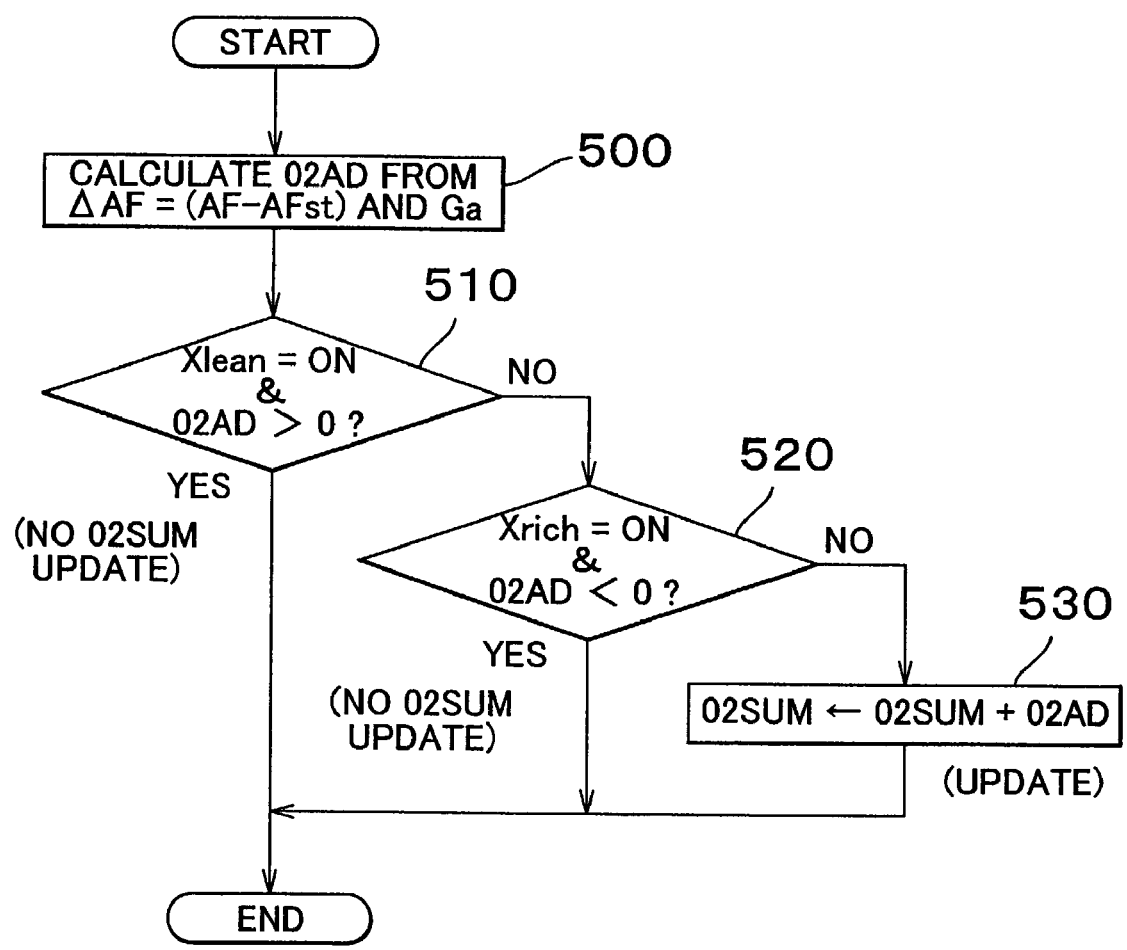
FIG. 14 is a flowchart of updating control for the oxygen storage integration amount.

FIG. 13 shows the change over time of each control amount relating to the estimation of the amount of stored oxygen of the catalyst 419. The oxygen storage integration amount O2SUM is obtained by estimating the amount of stored oxygen O2AD of the oxygen stored in the catalyst 419 (or discharged from the catalyst 419) from the difference $\Delta AF=(AF-AFst)$ between the exhaust air-fuel ratio AF detected by the upstream side air-fuel ratio sensor 425 that is disposed on the upstream side of the catalyst 419 and the stoichiometric air-fuel ratio AFst, and then integrating that amount of stored oxygen O2AD. The calculation of the oxygen storage integration amount O2SUM will be described referring to the flowchart shown in FIG. 14.

First, the exhaust air-fuel ratio AF of the exhaust gas that flows into the catalyst 419 is detected by the upstream side air-fuel ratio sensor 425 and the difference $\Delta AF=(AF-AFst)$ between this exhaust air-fuel ratio AF and the stoichiometric air-fuel ratio AFst is obtained by the ECU 418. Meanwhile, the airflow meter 413 detects the intake air amount Ga and the amount of stored oxygen O2AD of the oxygen stored in, or discharged from, the catalyst 419 is calculated from this intake air amount Ga and the exhaust air-fuel ratio difference ΔAF (Step 500). The calculation of the amount of stored oxygen O2AD may also be obtained from a map within the ECU 418 or by using an operational expression stored in the ECU 418.

With respect to the exhaust air-fuel ratio of the gas flowing out from the catalyst 419, after Step 500, it is determined whether the lean flag Xlean is on and whether the calculated amount of stored oxygen O2AD is a positive value (Step 510). When the exhaust air-fuel ratio detected by the downstream side air-fuel ratio sensor 426 that is disposed on the downstream side of the catalyst 419 is lean, the lean flag Xlean is on. When the exhaust air-fuel ratio detected by that downstream side air-fuel ratio sensor 426 is rich, the rich flag Xrich is on.

When the lean flag Xlean is on in Step 510, it means that the exhaust air-fuel ratio of the exhaust gas flowing out from the catalyst 419 is lean, thus there is a surplus of oxygen. Further, when the amount of stored oxygen O2AD is a positive value, it can be said that the exhaust gas flowing into the catalyst 419 contains oxygen that could be stored in the catalyst 419. Therefore, when the determination in Step 510 is YES, regardless of the fact that the exhaust gas flowing into the catalyst 419 contains oxygen that could be stored in the catalyst 419, the catalyst 419 already contains as much oxygen as it can store, and so it is unable to store any more oxygen.

Therefore, when the determination in Step 510 is YES, the routine ends as it is and the oxygen storage integration amount O2SUM of the catalyst 419 is not updated. If the oxygen storage integration amount O2SUM were to be updated when the determination in Step 510 was YES, the CPU would determine that oxygen, which in reality was unable to be stored, was stored, so updating of the oxygen storage integration amount O2SUM in this way is prohibited. When the determination in Step 510 is NO, it is then determined whether the rich flag Xrich is on and whether the calculated amount of stored oxygen O2AD is a negative value (Step 520).

When the rich flag Xrich is on, it means that the exhaust air-fuel ratio of the gas flowing out from the catalyst 419 is rich and there is a shortage of oxygen. Also, when the amount of stored oxygen O2AD is a negative value, it can be said that the exhaust air-fuel ratio of gas flowing into the catalyst 419 is rich and that the catalyst 419 should be discharging oxygen stored therein to purify the exhaust gas. Accordingly, when the determination in Step 520 is YES, regardless of the fact that the gas flowing into the catalyst 419 is purified by the oxygen discharged from the catalyst 419, the catalyst 419 has already discharged all of its oxygen so it can no longer discharge any more oxygen.

Therefore, when the determination in Step 520 is YES, the oxygen storage integration amount O2SUM of the catalyst 419 is not updated thereafter. If the oxygen storage integration amount O2SUM were to be updated when the determination in Step 520 was YES, the CPU would determine that oxygen, which in reality was unable to be discharged, was discharged, so updating of the oxygen storage integration amount O2SUM in this way is prohibited. When the determination in Step 520 is NO, the oxygen storage integration amount O2SUM is updated using the calculated amount of stored oxygen O2AD because the catalyst 419 is not in either i) a state where, despite the fact that there is oxygen that could be stored contained in the exhaust gas flowing into the catalyst 419, the catalyst 419 already contains as much oxygen as it can store, or ii) a state where, despite the fact that oxygen should be discharged into the exhaust gas flowing into the catalyst 419, the catalyst 419 has already discharged all of its oxygen (Step 530).

In this way, by updating the oxygen storage integration amount O2SUM using the amount of stored oxygen O2AD (with the exception of when the determination is YES in Step 510 or Step 520, in which case updating is prohibited) the oxygen amount stored in the catalyst 419 is always able to be accurately estimated. The history of the oxygen storage integration amount O2SUM generated in this way is shown in the upper part of the timing chart in FIG. 13. The oxygen storage integration amount O2SUM that is successively updated is then stored sequentially in the ECU 418.

Figure 15:
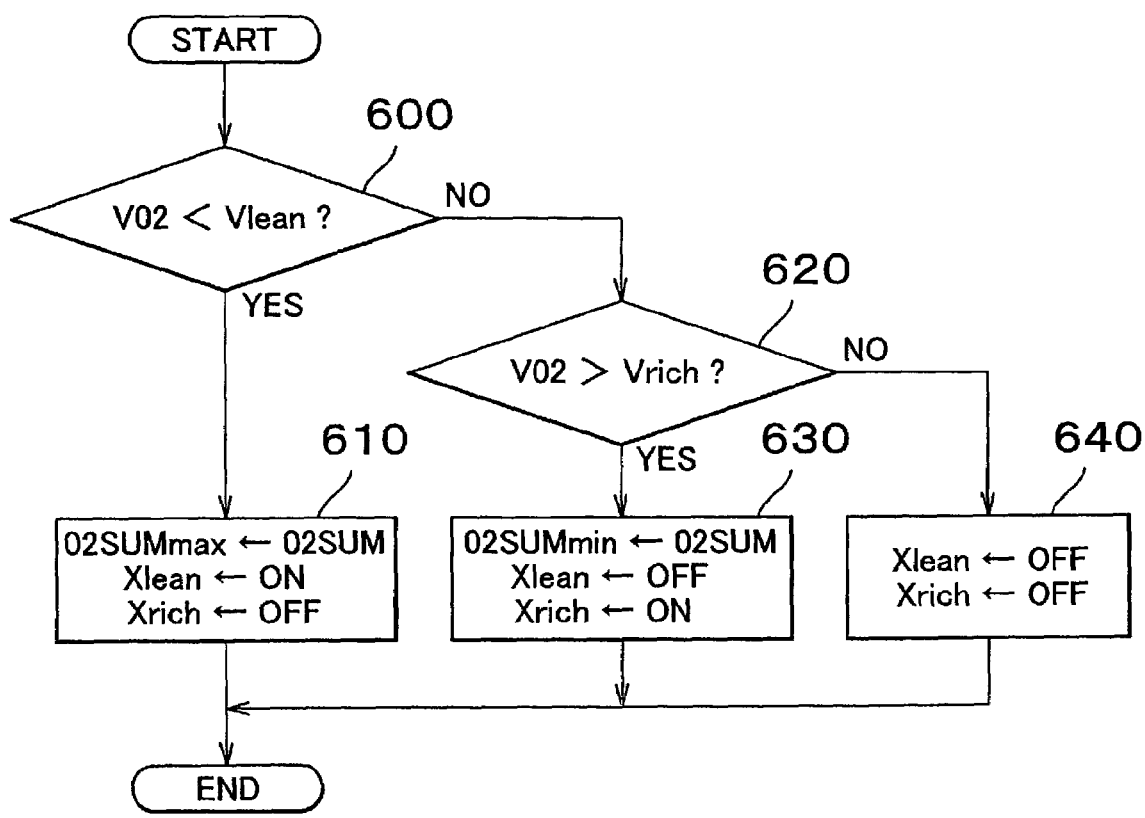
FIG. 15 is a flowchart of updating control of an upper limit and a lower limit of the oxygen storage integration amount.

Next, the calculation of the upper limit value O2SUMmax and lower limit value O2SUMmin of the oxygen storage integration amount O2SUM and the oxygen storage capability, will be described referring to the flowchart shown in FIG. 15. The upper limit value O2SUMmax and lower limit value O2SUMmin are corresponding to the maximum stored oxygen state and the minimum stored oxygen state respectively.

First it is determined whether an output voltage VO2 of the downstream side air-fuel ratio sensor 426 is below a preset lean side threshold Vlean (more specifically, 0.3V in this case) (Step 600). This is shown in the lower part of the timing chart in FIG. 13. When the output voltage VO2 is below the lean side threshold Vlean, it means that the catalyst 419 has stored oxygen up to the limit of its oxygen storage capability so it is thought that no more oxygen can be stored in the catalyst 419. Accordingly, when the determination in Step 600 is YES, the oxygen storage integration amount O2SUM is determined to have reached its upper limit and the oxygen storage integration amount O2SUM at that point is stored in the ECU 418 as the upper limit value O2SUMmax. Also, with respect to the flags indicating the state of the exhaust air-fuel ratio on the downstream side of the catalyst 419, the lean flag Xlean is set to on and the rich flag Xrich is set to off (Step 610).

When the determination in Step 600 is NO, it is determined whether the output voltage VO2 of the downstream side air-fuel ratio sensor 426 exceeds a preset rich side threshold Vrich (more specifically, 0.7V in this case) (Step 620). When the output voltage VO2 exceeds the rich side threshold Vrich, it means that the catalyst 419 has discharged all of its stored oxygen, so it is thought that the catalyst 419 is not able to discharge anymore oxygen. Accordingly, when the determination in Step 620 is YES, the oxygen storage integration amount O2SUM is determined to have reached its lower limit and the oxygen storage integration amount O2SUM at that point is stored in the ECU 418 as the lower limit value O2SUMmin. Also, with respect to the flags indicating the state of the exhaust air-fuel ratio on the downstream side of the catalyst 419, the lean flag Xlean is set to off and the rich flag Xrich is set to on (Step 630).

When the determination in Step 620 is NO, the output voltage VO2 of the downstream side air-fuel ratio sensor 426 is between the lean side threshold Vlean and the rich side threshold Vrich (Vlean≦VO2≦Vrich). Accordingly, the exhaust air-fuel ratio of the gas flowing out from the catalyst 419 is neither lean nor rich, but is taken as being close to the stoichiometric air-fuel ratio. In this case, both the lean flag Xlean and the rich flag Xrich are set to off (Step 640).

As described above, the history of the oxygen storage integration amount O2SUM is successively updated and the upper limit value O2SUMmax and the lower limit value O2SUMmin are updated from that history and the output from the downstream side air-fuel ratio sensor 426. Therefore, the maximum limit of the amount of oxygen able to be stored in the catalyst 419 (the oxygen storage capability) can be obtained by taking the difference of the upper limit value O2SUMmax minus the lower limit value O2SUMmin (i.e., O2SUMmax−O2SUMmin). The oxygen storage capability (O2SUMmax−O2SUMmin) of the catalyst 419 fluctuates depending on the state (i.e., temperature and state of deterioration and the like) of the catalyst 419, but is updated by the constant updating of the upper limit value O2SUMmax and the lower limit value O2SUMmin.

Here, a reference value O2SUMref=(O2SUMmax+ O2SUMmin)/2 of the oxygen storage integration amount O2SUM is set from the aforementioned upper limit value O2SUMmax and lower limit value O2SUMmin. A correction coefficient KAF of the fuel injection amount is determined from this reference value O2SUMref based on a map stored in the ECU 418, and then applied to the air-fuel ratio control. More specifically, a fuel injection amount (or the time that the valve of the injector 405 is open for fuel injection) TAU is corrected according to the following expression. TAU=TAUP×KAF×α

Here, TAUP is the basic fuel injection amount obtained from the intake air amount Ga and the engine rotation speed NE. The final fuel injection amount TAU is determined by correcting this basic fuel injection amount TAUP with the correction coefficient KAF and other various correction coefficients α and β. As an example of these other correction coefficients α and β, an air-fuel ratio feedback coefficient FAF is well known. The intake air-fuel ratio of the engine 401 is controlled by controlling this fuel injection amount TAU. A detailed explanation of various correction coefficients α and β other than the correction coefficient KAF will be omitted. Feedback control such that the oxygen storage integration amount O2SUM of the catalyst 419 becomes equal to the reference value O2sumref is performed by correcting the fuel injection amount using correction coefficient KAF, as described above.

In this exemplary embodiment, when the oxygen storage capability of the catalyst 419 is about to be actively detected, air-fuel ratio oscillating control is performed such that the exhaust air-fuel ratio of the exhaust gas flowing into the catalyst 419 oscillates alternately to the rich side and the lean side, and the oxygen storage integration amount O2SUM is actively increased and decreased. When the oxygen storage integration amount O2SUM is increased and decreased in this way, it is possible to detect the upper limit value O2SUMmax and the lower limit value O2SUMmin earlier on, such that earlier and accurate detection of the oxygen storage capability can be performed. During this air-fuel ratio oscillation control, control by the reference value O2sumref of the oxygen storage integration amount O2SUM is temporarily stopped.

However, when the oxygen storage capability is about to be detected (updated), it is possible that the exhaust purification performance could be made worse by the oxygen storage state of the catalyst 419 at that point. For example, when the catalyst 419 is storing oxygen to the point where it is nearly full to its upper limit, when the catalyst 419 starts to detect the upper limit value O2SUMmax and the exhaust air-fuel ratio is controlled to the lean side, the upper limit value O2SUMmax is soon reached and purification of the exhaust might not be sufficiently performed until this is controlled to the reverse side (the lower limit value O2SUMmin side). It is also possible that, when there is almost no oxygen stored in the catalyst 419, when the catalyst 419 starts to detect the lower limit value O2SUMmin and the exhaust air-fuel ratio is controlled to the rich side, the lower limit value O2SUMmin is soon reached and purification of the exhaust might not be sufficiently performed until this is controlled to the reverse side (the upper limit value O2SUMmax side), such that the exhaust purification performance might temporarily deteriorate in the same way.

Therefore, this exemplary embodiment is such that control for detecting the oxygen storage capability is allowed when the oxygen storage integration amount O2SUM is within a predetermined range. This predetermined range is set as a range where there is no fear of the exhaust purification rate becoming worse even if control for detecting the oxygen storage capability is performed. Furthermore, the variation (or the rate of change) of the oxygen storage integration amount O2SUM is also considered at the same time and whether that variation is equal to, or less then, a predetermined value is set as a condition for allowing the detection control. When the variation or the rate of change is large, it means that the oxygen storage integration amount O2SUM is actively changing. If control for detecting the oxygen storage capability is performed, the upper limit value O2SUMmax or lower limit value O2SUMmin would soon be reached and immediately thereafter the exhaust would not be able to be sufficiently purified. That is, the aforementioned predetermined value is set as an upper limit where there is no fear of making the exhaust purification rate worse even if the control for detecting the oxygen storage capability is performed.

Figure 16:
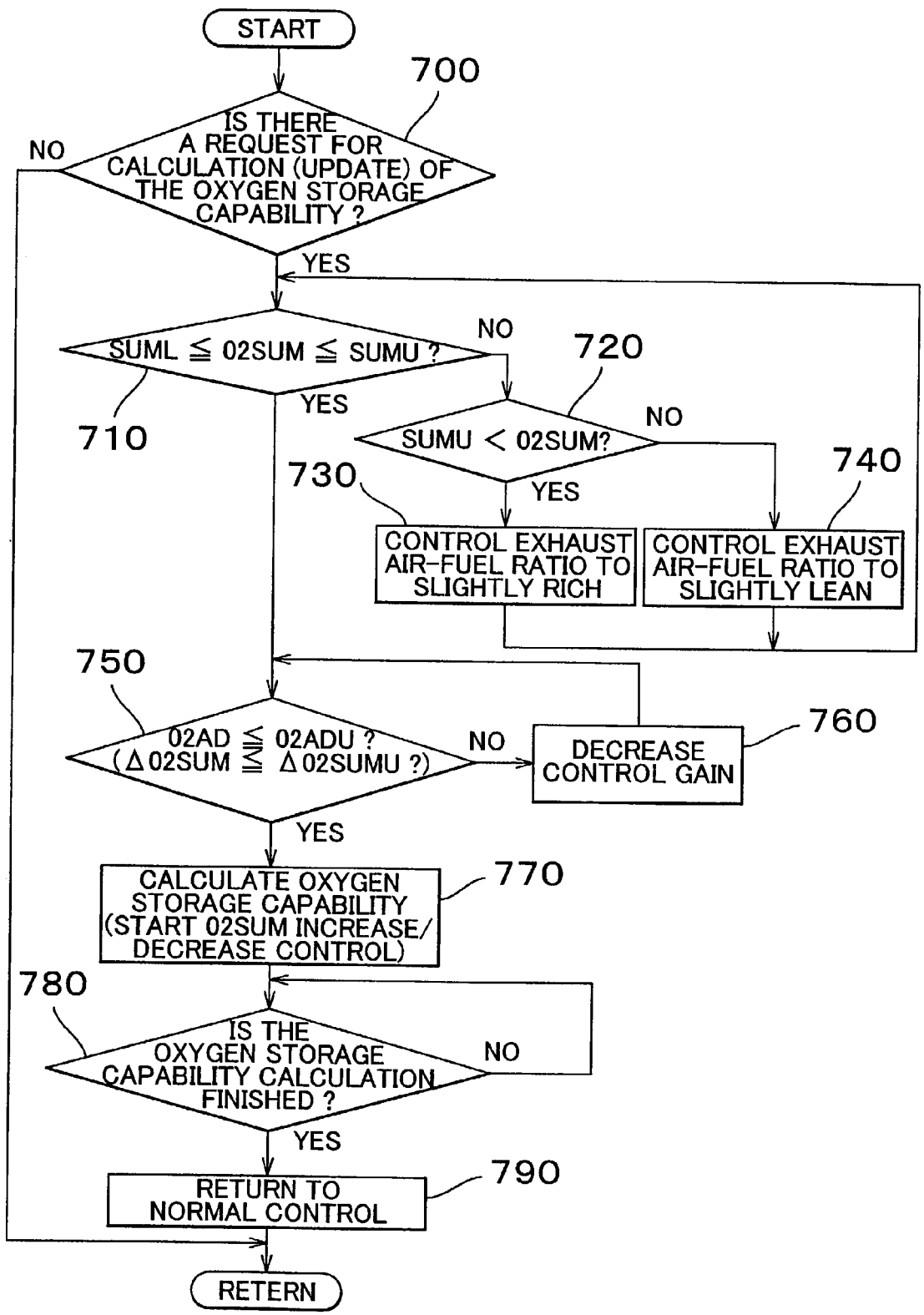
FIG. 16 is a flowchart of oxygen storage capability calculating control according to a seventh exemplary embodiment of the invention.

Further, according to this exemplary embodiment, when the oxygen storage integration amount O2SUM is not within the predetermined range, control is performed to actively bring it into the predetermined range. Moreover, even when the variation in the oxygen storage integration amount O2SUM is not equal to, or less than, the predetermined value, control is performed to bring this variation equal to, or less than, the predetermined value. FIG. 16 shows a flowchart of this exemplary embodiment. The flowchart shown in FIG. 16 is performed repeatedly at predetermined intervals of time (e.g., every few seconds).

First it is determined whether there has been a request to actively calculate (update) the oxygen storage capability (Step 700). The calculation request may be output at predetermined intervals of time or at predetermined intervals of distance driven, for example. The calculation request may also be output when the driving state of the internal combustion engine has reached a predetermined state. Step 700 is a step for monitoring whether the calculation request has been output. When the determination in Step 700 is NO, this control temporarily ends and is performed again from Step 700 during the next cycle of the routine.

Conversely, if the determination in Step 700 is YES, i.e., when a calculation request is being output, it is determined whether the oxygen storage integration amount O2SUM at that time is within a predetermined range between a lower limit value SUML and an upper limit value SUMU (Step 710). The oxygen storage integration amount O2SUM is constantly updated (there are also cases, however, in which updating is temporarily stopped) and it is determined here whether the oxygen storage integration amount O2SUM is within the aforementioned predetermined range. The lower limit value SUML and the upper limit value SUMU are set to the midpoint in a range determined by the upper limit value O2SUMmax and the lower limit value O2SUMmin at that point (the point at which the oxygen storage integration amount O2SUM was updated). For example, when the upper limit value O2SUMmax is set to 100 and the lower limit value O2SUMmin is set to 0, the upper limit value SUMU is set to 60 and the lower limit SUML is set to 40.

When the oxygen storage integration amount O2SUM is between the lower limit value SUML and the upper limit value SUMU, it can be determined that deterioration of the exhaust purification will not occur (or will be minimized) even if the oxygen storage integration amount O2SUM is increased and decreased in order to calculate the oxygen storage capability. Here, the lower limit value SUML and the upper limit value SUMU are set as variable values. However, both values (the lower limit value SUML and the upper limit value SUMU) may also be set as fixed values. When the determination in Step 710 is NO, it is first determined whether oxygen storage integration amount O2SUM is above or below the predetermined range in order to perform control to bring the oxygen storage integration amount O2SUM within the predetermined range. More specifically, it is determined whether the oxygen storage integration amount O2SUM is greater than the upper limit value SUMU (Step 720).

When the determination in Step 720 is YES, the exhaust air-fuel ratio is controlled to be slightly rich because the oxygen storage integration amount O2SUM is above the predetermined range, i.e., a sufficiently large amount of oxygen is stored (Step 730). After Step 730, the process returns to Step 710. By making the exhaust air-fuel ratio slightly rich, oxygen stored in the catalyst 419 is consumed such that the oxygen storage integration amount O2SUM eventually falls to within the predetermined range. Conversely, when the determination in Step 710 is NO, and further, when the determination in the following Step 720 is NO, the exhaust air-fuel ratio is controlled to be slightly lean because the oxygen storage integration amount O2SUM is below the predetermined range, i.e., the amount of stored oxygen is low (Step 740). After Step 740, the process returns to Step 710. By making the exhaust air-fuel ratio slightly lean, oxygen is stored in the catalyst 419 such that the oxygen storage integration amount O2SUM eventually rises to within the predetermined range.

When the determination in Step 710 is YES, it is then determined whether the variation in the oxygen storage integration amount O2SUM is in some predetermined range. Here, this is determined using the amount of stored oxygen O2AD as the variation O2AD. That is, it is determined whether the amount of stored oxygen O2AD is equal to, or less than, a predetermined value O2ADU (Step 750). When the determination in Step 750 is NO, the control gain for the purpose of increasing and decreasing the oxygen storage integration amount O2SUM is decreased in order to perform control such that the variation O2AD becomes equal, or less than, the predetermined value O2ADU (Step 760). By decreasing the control gain, the variation O2AD of the oxygen storage integration amount O2SUM becomes smaller and eventually becomes equal to, or less than, the predetermined value O2ADU. After Step 760, the process returns to Step 750. The predetermined value O2ADU may be a fixed value or it may be a variable value.

As the variation in the oxygen storage integration amount O2SUM, the difference between the oxygen storage integration amount O2SUM before a predetermined time and the oxygen storage integration amount O2SUM at that time can be calculated as ΔO2SUM and it can be determined whether this ΔO2SUM is equal to, or less than, a predetermined upper limit value ΔO2SUMU. Conversely, when the Step 750 is YES, it can be determined that the oxygen storage integration amount O2SUM is within the predetermined range and that the variation O2AD thereof is also equal to, or less than, the predetermined value O2ADU. In this case, in order to detect the oxygen storage capability, the upper limit value O2SUMmax and the lower limit value O2SUMmin are detected early on by actively increasing and decreasing the oxygen storage integration amount O2SUM. The oxygen storage capability is then calculated from these (Step 770). After Step 770, whether the calculation of the oxygen storage capability has ended is monitored in Step 780. When the calculation of the oxygen storage capability has ended, the aforementioned slight rich and slight lean control, or the control gain and the like, is returned to its original state such that the control returns to normal (Step 790).

According to this exemplary embodiment, it is determined prior to detecting the oxygen storage capability whether the oxygen storage integration amount O2SUM is within the predetermined range, and it is only when the oxygen storage integration amount O2SUM is within that predetermined range that detection of the oxygen storage capability is allowed by increasing and decreasing the oxygen storage integration amount O2SUM. Accordingly, it is possible to inhibit the deterioration of the exhaust purification at the time of detecting the oxygen storage capability. Further, when the oxygen storage integration amount O2SUM is not within the predetermined range, it is possible to perform control so as to bring the oxygen storage integration amount O2SUM within the predetermined range and perform early detection of the oxygen storage capability while inhibiting the deterioration of exhaust purification.

Moreover, according to this exemplary embodiment, it is determined prior to detecting the oxygen storage capability whether the variation (rate of change) of the oxygen storage integration amount O2SUM is equal to, or less than, a predetermined value, and it is only when that variation (rate of change) is equal to, or less than, the predetermined value that detection of the oxygen storage capability is allowed by increasing and decreasing the oxygen storage integration amount O2SUM. Accordingly, it is possible to inhibit the deterioration of the exhaust purification at the time of detecting the oxygen storage capability. Further, when the variation (rate of change) of the oxygen storage integration amount O2SUM is not equal to, or less than, the predetermined value, it is possible to perform control so as to bring the variation (rate of change) of the oxygen storage integration amount O2SUM equal to, or less than, the predetermined value and perform early detection of the oxygen storage capability while inhibiting the deterioration of exhaust purification.

In the foregoing exemplary embodiment, the upstream side air-fuel ratio sensor 425 and downstream side air-fuel ratio sensor 426, and the ECU 418 and the like function as stored oxygen amount detecting portions and oxygen storage capability detecting portions. Also, air-fuel ratio control portions such as the airflow meter 413 and the injector 405, in addition to the upstream side air-fuel ratio sensor 425 and downstream side air-fuel ratio sensor 426, and the ECU 418 and the like, function as stored oxygen amount controlling portions. Further, the ECU 418 and the like functions as detection-start allowing portion. In the foregoing control, when the determination in Step 760 is NO, the process returns to right before Step 750. However, it may also be made to return to right before Step 710.

The catalyst deterioration detecting apparatus of this invention is not limited to the foregoing exemplary embodiment. For example, in the foregoing exemplary embodiment, the history of the oxygen storage integration amount O2SUM of a certain point in time is updated with respect to a reference (O2SUM=0). Accordingly, the oxygen storage integration amount O2SUM is able to be either a positive value or a negative value. Alternatively, according to another exemplary embodiment, the state in which the catalyst 419 has completely discharged all of its oxygen is detected and this point can be made the reference (oxygen storage integration amount 02SUM=0). In this case, the oxygen storage integration amount 02SUM is taken only as a positive value and only the upper limit value 02SUMmax is set. In this way, it is conceivable that control be performed only on the upper limit value 02SUMmax side, without control using both the upper limit value 02SUMmax and the lower limit value 02SUMmin.

Exemplary Embodiment 8

Figure 17:
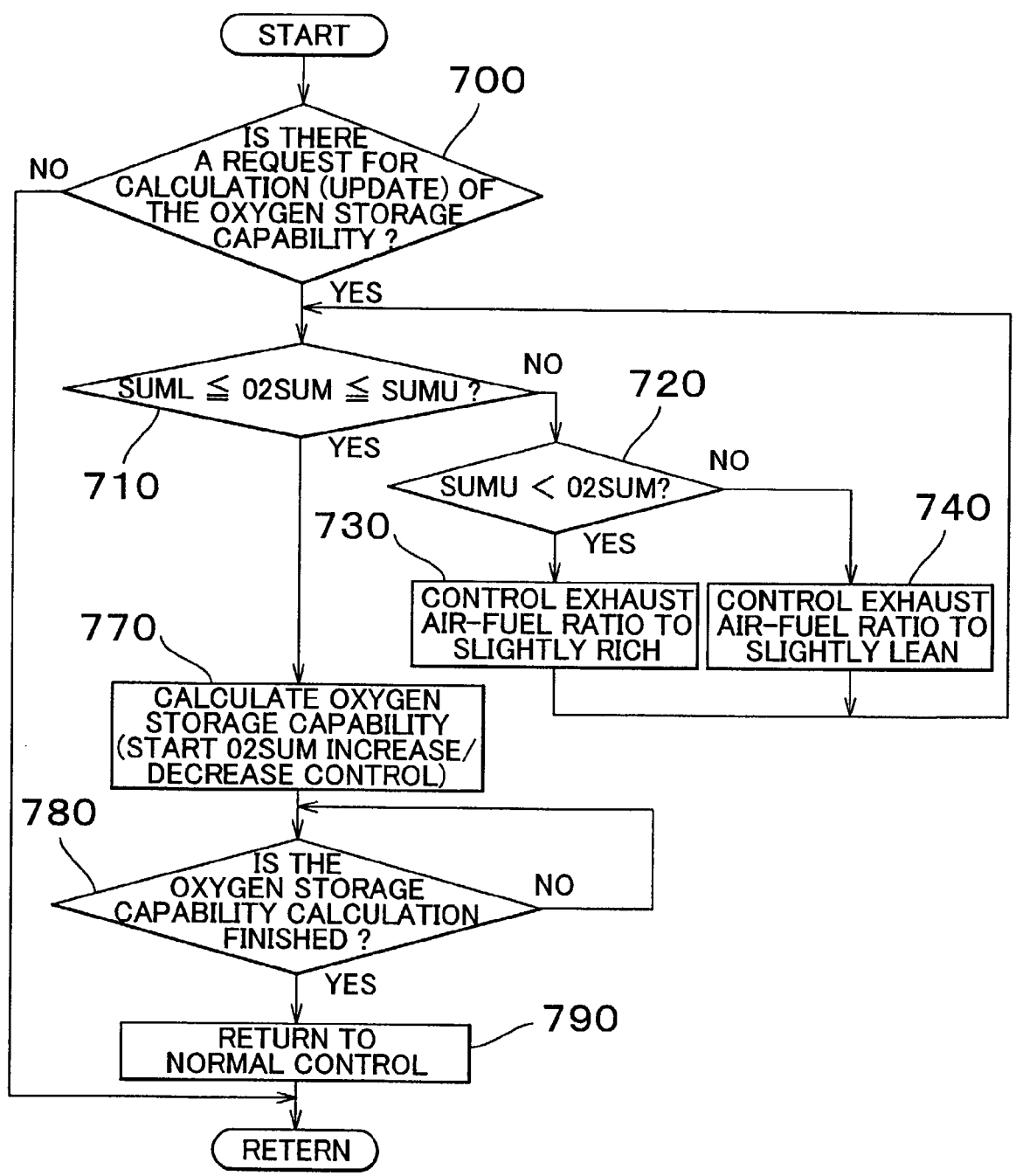
FIG. 17 is a flowchart of an oxygen storage capability calculating control according to an eighth exemplary embodiment of the invention.

Further, according to the foregoing exemplary embodiment, control for detecting the oxygen storage capability is allowed when both the oxygen storage integration amount 02SUM is within a predetermined range and the variation (rate of change) thereof is equal to, or less than, a predetermined value. However, it is also possible to require that only one of those two conditions be fulfilled to allow detection of the oxygen storage capability. FIG. 17 shows a flowchart in the case when the only requirement to allow detection is that the oxygen storage integration amount 02SUM be within the predetermined range. In the flowchart shown in FIG. 17 as well, when the oxygen storage integration amount 02SUM is not within the predetermined range, it is controlled so as to become within the predetermined range. The steps in the flowchart shown in FIG. 17 that are the same as steps in the flowchart shown in FIG. 16 are denoted by the same reference numerals, so explanations thereof will be omitted.

Exemplary Embodiment 9

Figure 18:
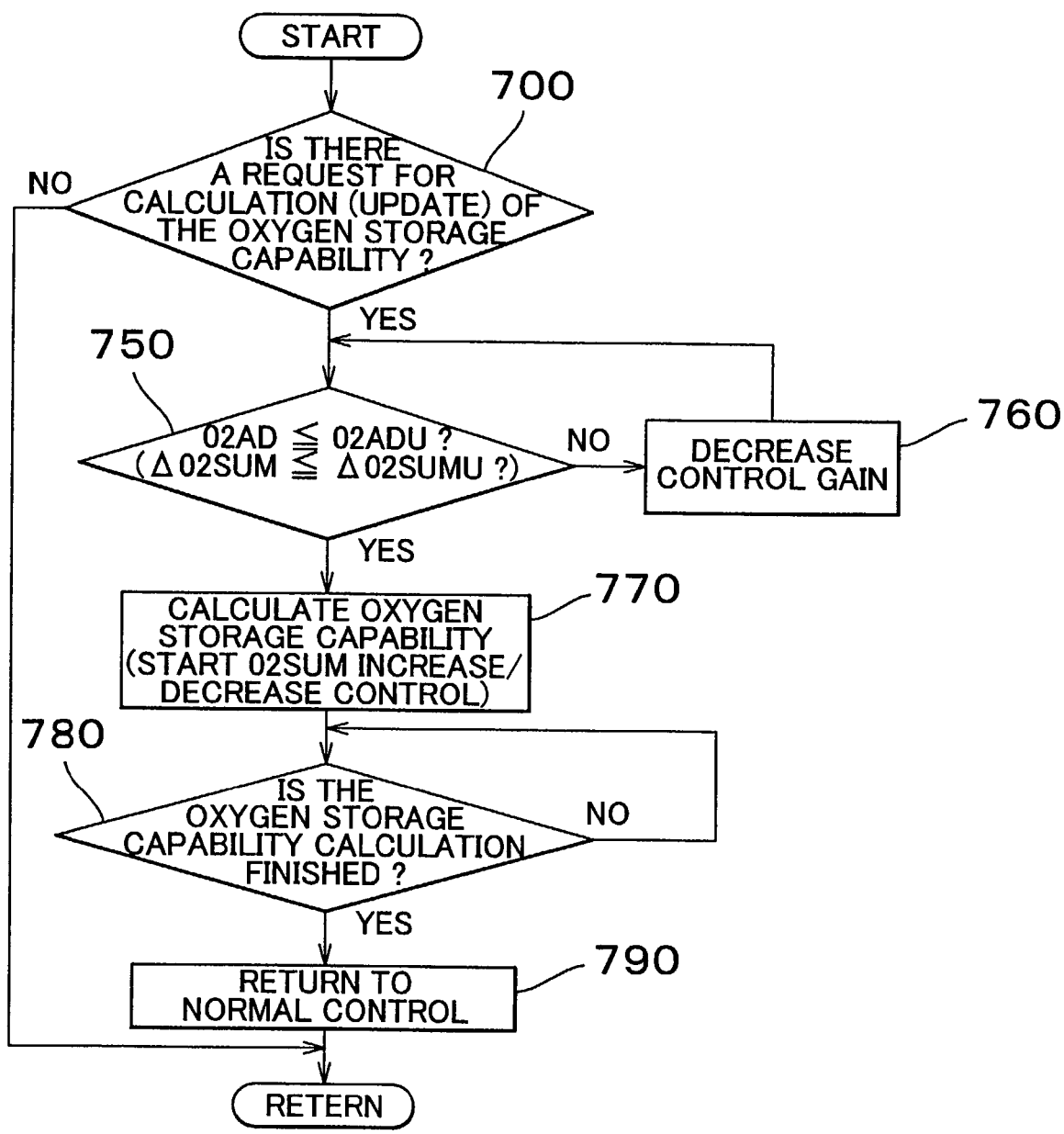
FIG. 18 is a flowchart of an oxygen storage capability calculating control according to a ninth exemplary embodiment of the invention.

FIG. 18 shows a flowchart in the case when the only requirement to allow detection is that the variation (rate of change) of the oxygen storage integration amount 02SUM be equal to, or less than, a predetermined value. In the flowchart shown in FIG. 8 as well, when the variation (rate of change) of the oxygen storage integration amount 02SUM is not equal to, or less than, the predetermined value, it is controlled so as to become equal to, or less than, the predetermined value. The steps in the flowchart shown in FIG. 18 that are the same as steps in the flowchart shown in FIG. 16 are denoted by the same reference numerals, so explanations thereof will be omitted.

The controllers (e.g., the ECU 42 and the ECU 418) of the illustrated embodiment are implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A catalyst deterioration detecting apparatus for an internal combustion engine, comprising:
    an upstream side catalyst disposed in an exhaust passage of the internal combustion engine;
    a downstream side catalyst disposed downstream of the upstream side catalyst;
    a first oxygen sensor that detects an oxygen concentration of an exhaust gas which flows out from the upstream side catalyst; and
    a controller that:
        detects a maximum stored oxygen state of the upstream side catalyst, from which exhaust gas having an excess amount of oxygen flows out downstream, based on a detection value of the first oxygen sensor;
        detects a minimum stored oxygen state of the upstream side catalyst, from which exhaust gas having a shortage of oxygen flows out downstream, based on the detection value of the first oxygen sensor;
        forces an air-fuel ratio, of a mixture to be supplied to the internal combustion engine, to be rich after the upstream side catalyst has reached the maximum stored oxygen state until the upstream side catalyst has reached the minimum stored oxygen state;
        forces the air-fuel ratio, of the mixture to be supplied to the internal combustion engine, to be lean after the upstream side catalyst has reached the minimum stored oxygen state until the upstream side catalyst has reached the maximum stored oxygen state;
        selectively detects, as an oxygen storage capacity of the upstream side catalyst, an amount of oxygen discharged by the upstream side catalyst during a process in which the upstream side catalyst shifts from the maximum stored oxygen state to the minimum stored oxygen state and an amount of oxygen stored by the upstream side catalyst during a process in which the upstream side catalyst shifts from the minimum stored oxygen state to the maximum stored oxygen state;
        determines whether the downstream side catalyst is in a predetermined state to store both oxygen equal to, or greater than, a predetermined amount and discharge oxygen equal to, or greater than, a predetermined amount; and
        determines a deterioration state of the upstream side catalyst based on the oxygen storage capacity, wherein a determination of the deterioration state of the upstream side catalyst is allowed to start only when the downstream side catalyst is in the predetermined state.

2. The catalyst deterioration detecting apparatus according to claim 1, wherein the controller controls the internal combustion engine in order to control the air-fuel ratio of the mixture to be supplied to the internal combustion engine when the downstream side catalyst is not in the predetermined state such that the downstream side catalyst becomes in the predetermined state.

3. The catalyst deterioration detecting apparatus according to claim 2, wherein the controller further:
  detects an oxygen storage limit state of the downstream side catalyst, in which the downstream side catalyst is unable to store equal to, or greater than, a predetermined amount of oxygen;
  detects an oxygen discharge limit state of the downstream side catalyst, in which the downstream side catalyst is unable to discharge equal to, or greater than, a predetermined amount of oxygen;
  forces the air-fuel ratio, of the mixture to be supplied to the internal combustion engine, to be rich until the downstream side catalyst reaches the predetermined state, when the downstream side catalyst is in the oxygen storage limit state; and
  forces the air-fuel ratio, of the mixture to be supplied to the internal combustion engine to be lean until the downstream side catalyst reaches the predetermined state, when the downstream side catalyst is in the oxygen discharge limit state.

4. The catalyst deterioration detecting apparatus according to claim 1, the controller further:
  controls the internal combustion engine such that the air-fuel ratio alternates rich and lean until the oxygen storage capacity of the upstream side catalyst is detected a predetermined number of times;
  determines a deterioration state of the upstream side catalyst based on the oxygen storage capacity which has been detected the predetermined number of times; and
  corrects at least one of a control parameter for the air-fuel ratio to be rich and a control parameter for the air-fuel ratio to be lean such that the downstream side catalyst moves to the predetermined state when the downstream side catalyst is not in the predetermined state after the series of processes for determining the deterioration state of the upstream side catalyst have started and before the oxygen storage capacity has been detected the predetermined number of times.

5. The catalyst deterioration detecting apparatus according to claim 1, further comprising:
  a second oxygen sensor that detects the oxygen concentration of exhaust gas that flows out from the downstream side catalyst; and
  the controller further:
    compares an output from the second oxygen sensor with a first determination value indicating that the exhaust gas has an excess amount of oxygen;
    compares the output from the second oxygen sensor with a second determination value indicating that the exhaust gas has a shortage of oxygen; and
    determines the downstream side catalyst to be in the predetermined state when the output from the second oxygen sensor is within a predetermined range defined by the first determination value and the second determination value.

6. The catalyst deterioration detecting apparatus according to claim 1, wherein the controller further:
  estimates the amount of oxygen stored in the downstream side catalyst and the amount of oxygen discharged from the downstream side catalyst, based on an output from the first oxygen sensor;
  calculates the oxygen storage integration amount stored in the downstream side catalyst by integrating the estimated amount of oxygen based on an output from the first oxygen sensor; and
  determines the downstream side catalyst to be in the predetermined state when the oxygen storage integration amount is within a predetermined range defined by a first integration value and a second integration value, wherein the first integration value is an upper limit value of the oxygen storage integration amount, in which the downstream side catalyst is able to store oxygen equal to, or greater than, the predetermined amount, and the second integration value is a lower limit value of the oxygen storage integration amount, in which the downstream side catalyst is able to discharge oxygen equal to, or greater than, the predetermined amount.

7. The catalyst deterioration detecting apparatus according to claim 1, the controller further:
  detects a fuel cut of the internal combustion engine; and
  estimates the amount of oxygen stored in the downstream side catalyst at the time of the fuel cut, wherein the controller calculates the oxygen storage integration amount stored in the downstream side catalyst by integrating the estimated amount of oxygen based on an output from the first oxygen sensor and the estimated amount of oxygen stored in the downstream side catalyst at the time of the fuel cut.

8. A catalyst deterioration detecting apparatus for an internal combustion engine, comprising:
  an upstream side catalyst disposed in an exhaust passage of the internal combustion engine;
  a downstream side catalyst disposed downstream of the upstream side catalyst;
  a first oxygen sensor that detects an oxygen concentration of an exhaust gas which flows out from the upstream side catalyst; and
  a controller that:
    detects a maximum stored oxygen state of the upstream side catalyst, from which exhaust gas having an excess amount of oxygen flows out downstream, based on a detection value of the first oxygen sensor;
    detects a minimum stored oxygen state of the upstream side catalyst, from which exhaust gas having a shortage of oxygen flows out downstream, based on the detection value of the first oxygen sensor;
    forces an air-fuel ratio, of a mixture to be supplied to the internal combustion engine, to be rich after the upstream side catalyst has reached the maximum stored oxygen state until the upstream side catalyst has reached the minimum stored oxygen state;
    forces the air-fuel ratio, of the mixture to be supplied to the internal combustion engine, to be lean after the upstream side catalyst has reached the minimum stored oxygen state until the upstream side catalyst has reached the maximum stored oxygen state;
    selectively detects, as an oxygen storage capacity of the upstream side catalyst, an amount of oxygen discharged by the upstream side catalyst during a process in which the upstream side catalyst shifts from the maximum stored oxygen state to the minimum stored oxygen state and an amount of oxygen stored by the upstream side catalyst during a process in which the upstream side catalyst shifts from the minimum stored oxygen state to the maximum stored oxygen state;
    determines a deterioration state of the upstream side catalyst based on the oxygen storage capacity;
    determines whether the downstream side catalyst is in a predetermined state to both store oxygen equal to, or greater than, a predetermined amount and discharge oxygen equal to, or greater than a predetermined amount; and corrects at least one of a control parameter for the air-fuel ratio to be rich and a control parameter for the air-fuel ratio to be lean such that the downstream side catalyst becomes in the predetermined state when the downstream side catalyst is not in the predetermined state.

9. A catalyst deterioration detecting apparatus for an internal combustion engine, comprising:

a catalyst disposed in an exhaust passage of the internal combustion engine;

a sensor that detects an oxygen concentration of the exhaust gas which flows out from the catalyst; and a controller that:

detects an amount of oxygen stored in the catalyst;

controls the amount of stored oxygen in the catalyst by controlling an exhaust air-fuel ratio of the exhaust gas that flows into the catalyst, wherein the controller controls the internal combustion engine in order to control the exhaust air-fuel ratio of the exhaust gas that flows into the catalyst; and detects an oxygen storage capability of the catalyst using previously detected amounts of stored oxygen, while increasing and decreasing the amount of stored oxygen, wherein a detection of the oxygen storage capability is allowed to start only when the detected amount of stored oxygen is within a predetermined range that is within a previously detected upper limit value and lower limit value.

10. The catalyst deterioration detecting apparatus according to claim 9, wherein the controller controls the amount of stored oxygen so as to become within the predetermined range when it is determined that the amount of stored oxygen is outside of the predetermined range.

11. The catalyst deterioration detecting apparatus according to claim 9, wherein the controller allows determination of the oxygen storage capability to start only when the amount of stored oxygen is within the predetermined range and at least one of a variation and a rate of change in the amount of stored oxygen is equal to, or less than, a predetermined value.

12. A catalyst deterioration detecting apparatus for an internal combustion engine, comprising:

a catalyst disposed in an exhaust passage of the internal combustion engine;

a sensor that detects an oxygen concentration of the exhaust gas which flows out from the catalyst; and a controller that:

detects an amount of oxygen stored in the catalyst;

controls the amount of stored oxygen in the catalyst by controlling an exhaust air-fuel ratio of the exhaust gas that flows into the catalyst, wherein the controller controls the internal combustion engine in order to control the exhaust air-fuel ratio of the exhaust gas that flows into the catalyst;

detects at least one of a variation and a rate of change in the detected amount of stored oxygen; and detects an oxygen storage capability of the catalyst using previously detected amounts of stored oxygen, while increasing and decreasing the amount of stored oxygen, wherein a detection of the oxygen storage capability is allowed to start only when at least one of the variation and the rate of change in the detected amount of stored oxygen is equal to, or less than, a predetermined value.

13. The catalyst deterioration detecting apparatus according to claim 12, wherein the controller controls the amount of stored oxygen such that the variation becomes equal to, or less than, the predetermined value when it is determined that the variation in the amount of stored oxygen has exceeded the predetermined value.

14. A method for detecting deterioration of a catalyst of an internal combustion engine with an upstream side catalyst disposed in an exhaust passage of the internal combustion engine, a downstream side catalyst disposed downstream of the upstream side catalyst and a first oxygen sensor that detects an oxygen concentration of an exhaust gas which flows out from the upstream side catalyst, comprising:

detecting a maximum stored oxygen state of the upstream side catalyst, from which exhaust gas having an excess amount of oxygen flows out downstream, based on a detection value of the first oxygen sensor;

detecting a minimum stored oxygen state of the upstream side catalyst, from which exhaust gas having a shortage of oxygen flows out downstream, based on the detection value of the first oxygen sensor;

forcing an air-fuel ratio, of a mixture to be supplied to the internal combustion engine, to be rich after the upstream side catalyst has reached the maximum stored oxygen state until the upstream side catalyst has reached the minimum stored oxygen state;

forcing the air-fuel ratio, of the mixture to be supplied to the internal combustion engine, to be lean after the upstream side catalyst has reached the minimum stored oxygen state until the upstream side catalyst has reached the maximum stored oxygen state;

selectively detecting, as an oxygen storage capacity of the upstream side catalyst, an amount of oxygen discharged by the upstream side catalyst during a process in which the upstream side catalyst shifts from the maximum stored oxygen state to the minimum stored oxygen state and an amount of oxygen stored by the upstream side catalyst during a process in which the upstream side catalyst shifts from the minimum stored oxygen state to the maximum stored oxygen state;

determining whether the downstream side catalyst is in a predetermined state to store both oxygen equal to, or greater than, a predetermined amount and discharge oxygen equal to, or greater than, a predetermined amount; and determining a deterioration state of the upstream side catalyst based on the oxygen storage capacity, wherein a determination of the deterioration state of the upstream side catalyst is allowed to start only when the downstream side catalyst is in the predetermined state.

15. A method for detecting deterioration of a catalyst of an internal combustion engine with an upstream side catalyst disposed in an exhaust passage of the internal combustion engine, a downstream side catalyst disposed downstream of the upstream side catalyst and a first oxygen sensor that detects an oxygen concentration of an exhaust gas which flows out from the upstream side catalyst, comprising:

detecting a maximum stored oxygen state of the upstream side catalyst, from which exhaust gas having an excess amount of oxygen flows out downstream, based on a detection value of the first oxygen sensor;

detecting a minimum stored oxygen state of the upstream side catalyst, from which exhaust gas having a shortage of oxygen flows out downstream, based on the detection value of the first oxygen sensor;

forcing an air-fuel ratio, of a mixture to be supplied to the internal combustion engine, to be rich after the upstream side catalyst has reached the maximum stored oxygen state until the upstream side catalyst has reached the minimum stored oxygen state;

forcing the air-fuel ratio, of the mixture to be supplied to the internal combustion engine, to be lean after the upstream side catalyst has reached the minimum stored oxygen state until the upstream side catalyst has reached the maximum stored oxygen state;

selectively detecting, as an oxygen storage capacity of the upstream side catalyst, an amount of oxygen discharged by the upstream side catalyst during a process in which the upstream side catalyst shifts from the maximum stored oxygen state to the minimum stored oxygen state and an amount of oxygen stored by the upstream side catalyst during a process in which the upstream side catalyst shifts from the minimum stored oxygen state to the maximum stored oxygen state;

determining a deterioration state of the upstream side catalyst based on the oxygen storage capacity;

determining whether the downstream side catalyst is in a predetermined state to both store oxygen equal to, or greater than, a predetermined amount and discharge oxygen equal to, or greater than a predetermined amount; and correcting at least one of a control parameter of the force-rich portion and a control parameter of the force-lean portion such that the downstream side catalyst becomes in the predetermined state when the downstream side catalyst is not in the predetermined state.

16. A method for detecting deterioration of a catalyst for an internal combustion engine, comprising:

detecting an amount of oxygen stored in a catalyst;

controlling the amount of stored oxygen in the catalyst by controlling an exhaust air-fuel ratio of an exhaust gas that flows into the catalyst; and detecting an oxygen storage capability of the catalyst using previously detected amounts of stored oxygen, while increasing and decreasing the amount of stored oxygen, wherein a detection of the oxygen storage capability is allowed to start only when the detected amount of stored oxygen detected is within a predetermined range that is within a previously detected upper limit value and lower limit value.

17. A method for detecting deterioration of a catalyst for an internal combustion engine, comprising:

detecting an amount of oxygen stored in a catalyst;

controlling the amount of stored oxygen in the catalyst by controlling an exhaust air-fuel ratio of an exhaust gas that flows into the catalyst;

detecting a variation in the detected amount of stored oxygen; and detecting an oxygen storage capability of the catalyst using previously detected amounts of stored oxygen, while increasing and decreasing the amount of stored oxygen, wherein a detection of the oxygen storage capability is allowed to start only when the variation in the detected amount of stored oxygen is equal to, or less than, a predetermined value.

* * * * *